(12) United States Patent (10) Patent No.: US 12,640,048 B2
Sten (45) Date of Patent: May 26, 2026

(54) ADJUSTABLE SIMULATION RIG AND A SEATING UNIT FOR USE THEREWITH

(71) Applicant: Matthew Sten, Sunbury (AU)

(72) Inventor: Matthew Sten, Sunbury (AU)

(*) Notice: Subject to any disclaimer, the term of this patent is extended or adjusted under 35 U.S.C. 154(b) by 274 days.

(21) Appl. No.: 18/577,820

(22) PCT Filed: Jul. 13, 2022

(86) PCT No.: PCT/AU2022/050733
§ 371 (c)(1),
(2) Date: Jan. 9, 2024

(87) PCT Pub. No.: WO2023/283686
PCT Pub. Date: Jan. 19, 2023

(65) Prior Publication Data
US 2024/0331565 A1 Oct. 3, 2024

(30) Foreign Application Priority Data

Jul. 13, 2021 (AU) ................................ 2021902140
Feb. 11, 2022 (AU) ................................ 2022900287

(51) Int. Cl.
*G09B 9/04* (2006.01)
*A47C 15/00* (2006.01)

(52) U.S. Cl.
CPC .............. *G09B 9/04* (2013.01); *A47C 15/004* (2013.01)

(58) Field of Classification Search
CPC ........... G09B 9/02; G09B 9/04; A63F 13/803; A47C 15/004; A47C 4/00
See application file for complete search history.

(56) References Cited

U.S. PATENT DOCUMENTS 5,082,328 A * 1/1992 Garelick ................. B63B 29/04
297/344.21
6,083,106 A * 7/2000 McDowell ............ A63F 13/803
463/6
2004/0254020 A1 12/2004 Dragusin
2022/0176257 A1* 6/2022 Smit ....................... A63F 13/90
(Continued)

FOREIGN PATENT DOCUMENTS

CN 215304345 U * 12/2021
EP 2820976 A2 * 1/2015 .............. G09B 9/28
GB 2469307 A 10/2010
(Continued)

OTHER PUBLICATIONS

Mark Armstrong; International Search Report and Written Opinion; International Application No. PCT/AU2022/050733; Sep. 21, 2022; Australian Patent Office; Woden, ACT, Australia.
(Continued)

*Primary Examiner* — Kang Hu
*Assistant Examiner* — Correll T French
(74) *Attorney, Agent, or Firm* — Stevens & Showalter LLP

(57) ABSTRACT

An adjustable rig (10) for a simulator is disclosed. The rig comprises a support frame (11) having a longitudinal axis (L), a seating module (12) couplable to the support frame, a steering module (13) couplable to the support frame, and a pedal module (14) couplable to the support frame. Each of the modules is adjustable in three directions relative to the longitudinal axis of the support frame when coupled thereto.

20 Claims, 16 Drawing Sheets

(56)  References Cited

U.S. PATENT DOCUMENTS

2023/0185325 A1 *   6/2023   Kan  ........................ B60K 26/02
74/512

FOREIGN PATENT DOCUMENTS

WO        2020185072  A1      9/2020
WO        2021217230  A1     11/2021

OTHER PUBLICATIONS

Beaucé, Gaëtan; Extended European Search Report dated Apr. 3, 2025; European Application No. 22840864.7; European Patent Office; Munich, Germany.

* cited by examiner

ADJUSTABLE SIMULATION RIG AND A SEATING UNIT FOR USE THEREWITH

TECHNICAL FIELD

A rig is disclosed for recreational or training simulation. In particular, a rig is disclosed that provides increased adjustability for users of different physiques and/or to simulate a variety of racing positions.

Also disclosed is a seating unit for a chassis. The seating unit may be used in the above-mentioned rig. In particular, the seating unit may comprise a seat assembly that includes a base frame portion and a back frame portion that are coupled together in a operable configuration by a rigid connector member.

BACKGROUND

Broadly speaking, racing simulators rely upon a combination of specialised software and skeuomorphic input devices to replicate to varying degrees of realism the experience of motor racing.

As the quality of software has developed, racing simulators have moved beyond the sphere of gaming applications and are now frequently used by professional racing drivers as training devices. Accordingly, whilst traditional video games are played with a hand-held controller, racing simulators typically include bespoke rigs comprising wheel, seat and pedal setups that accurately replicate their real-world counterparts.

It is typical for professional racing simulator rigs to be designed for a specific type of racing, for example open-wheel Formula racing or tin-top touring car and GT-style racing. This is because of the difficulties in sufficiently replicating the driving positions of each of these types of vehicles, which differ greatly from one another. Such rigs commonly offer little range of adjustment to accommodate users of differing sizes and heights. This is a growing problem for an industry seeing increasing participation by female athletes who must train in rigs that may be too large or ergonomically unsuited.

In contrast, consumer-focused racing simulator rigs provide a more general driving position that attempts to straddle a medium between the upright seating position of tin-top racing vehicles and the recumbent position of Formula vehicles. Whilst such generalised rigs are popular with casual gamers, they fail to replicate the driving position of racing cars to a sufficient degree to be suitable for professional drivers. Such rigs also fail to replicate the degree of realism inherent in professional-focused rigs.

Accordingly, it would be advantageous to provide a racing simulator rig having increased adjustability. It would be desirable if such a rig was simple to adjust between positions. It would be beneficial for such a rig to be suitable for both professional and casual use.

Seats for simulation rigs (as well as for passenger vehicles) typically comprise a multi-part metal support skeleton that is coupled to a sliding cassette assembly mounted to the rig base (or vehicle floor or chassis).

The support skeleton provides some level of adjustably to the seating position for an occupant, to enable the occupant to obtain an ergonomically suitable seating and/or driving position. Meanwhile, the sliding cassette frame enables the seat to be moved toward and away from the rig controls to suit occupants of differing stature. The seat is then generally covered by a fabric upholstery and cushioning foam to provide comfort and an acceptable aesthetic appearance.

Such seats are relatively complex to assemble, and lack rigidity making them generally unsuited to use in performance vehicles and racing simulation rigs.

Because of the above drawbacks, performance vehicles and simulation rigs typically feature a single piece molded seat "shell". Such seat shells offer significantly improved rigidity and ease of manufacture and fitment, however lack nearly any level of ergonomic adjustability. Furthermore, such molded shells are inherently bulky, requiring an exorbitant sized packaging for shipping and storage. This makes such seats expensive to ship.

Accordingly, it would also be advantageous to provide a seat having improved levels of adjustability for an occupant. It would be desirable if such a seat was cost effective to manufacture and/or ship. It would be beneficial for such a seat to be suitable for use across many different rig or chassis types.

SUMMARY

In a first aspect, there is disclosed an adjustable rig for a simulator, comprising: a support frame having a longitudinal axis; a seating module couplable to the support frame; a steering module couplable to the support frame; and a pedal module couplable to the support frame; wherein each of the modules is adjustable in three directions relative to the longitudinal axis of the support frame when coupled thereto.

Each module may include a longitudinal adjustment means that provide adjustment in a lengthwise direction along the longitudinal axis of the support frame when coupled thereto. In an embodiment, the longitudinal adjustment means comprise at least one slide rail, such as lateral slide rails.

Each of the modules may include a mounting member, the position of which is adjustable in a or the lengthwise, angular and height directions relative to the support frame when coupled thereto. The mounting member of the steering module may be a wheel mounting member for mounting a steering wheel thereto. The mounting member of the pedal module may be a pedal mounting member for mounting a set of pedals thereto. The mounting member of the seating module may be seat mounting member for mounting a seat thereto. In an embodiment, each mounting member comprises a mounting plate.

In some embodiments, each module may include one or more adjustable support members that are configured to provide adjustment of each module in at least one of a height direction perpendicular to the longitudinal axis of the support frame and an angular direction relative to a longitudinal axis of the support frame when coupled thereto. The support members may be connectable to the mounting member in order to adjust the position of the mounting member relative to the support frame.

In an embodiment, the adjustable support member comprises a bracket. While the following description will focus on the embodiment where the support member comprises a bracket, it is to be understood that the rig is not limited thereto and may encompass other support structures.

The or each bracket may include a plurality of fastener positions for receiving a fastener to set the respective mounting member at a predetermined position relative to the support frame. The or each bracket may further include an elongate slot within which the plurality of fastener positions are located to set the respective mounting member at discrete positions relative to the support frame. The fastener may be adjustable via a knob or lever facilitating manual adjustment of the position of the mounting member.

In some embodiments, the fastener positions of the steering module brackets provide height adjustment of the respective mounting plate relative to the support frame. The mounting plate of the steering module is pivotally attached to the brackets to provide angular adjustment thereof relative to the support frame.

The slots of the pedal module brackets provide angular adjustment of the respective mounting plate relative to the support frame. The pedal module may include a second pair of brackets arranged such that the first pair of brackets is nested between the second pair of brackets and the respective mounting plate, the first and second pair of brackets together providing height adjustment of the mounting plate relative to the support frame. The second pair of brackets may include an elongate opening for interconnecting the second brackets with the first brackets.

In some embodiments, the slots of the seating module brackets may provide angular adjustment of the respective mounting plate relative to the support frame. The brackets of the seating module may include a second slot, the first and second slot together providing height adjustment of the respective mounting plate with respect to the support frame. The brackets of the seating module may include a plurality of apertures adjacent to the second slot, the apertures configured to receive a detent to provide fine angular adjustment of the respective mounting plate relative to the support frame. The detents of each bracket may be interconnected via a spring-loaded cable, facilitating fine angular adjustment of the respective mounting plate via a pull lever.

The support frame may comprise a pair of U-shaped side members extending along the longitudinal axis thereof and a U-shaped base member that extends therebetween.

The side members may be slidably attached to the base member facilitating adjustment of a length of the support frame along its longitudinal axis.

In a second aspect, there is disclosed a seating unit for a chassis, comprising: a seat assembly including: a base frame portion; a back frame portion; and a rigid connection member having a first support surface configured to support the base frame portion and a second support surface configured to support the back frame portion; wherein in an operable configuration of the seat assembly the base frame portion is fixedly coupled to the back frame portion in an inclined orientation relative thereto by the connection member; and wherein in a stowed configuration the base frame portion is separated from and nested within the back frame portion.

In use, in the operable configuration, the connection member is able to provide a rigid and substantially flex free seat assembly. Further, with the seat assembly in the stowed configuration, the base frame portion and the back frame portion are not coupled together, with the base frame portion being nested within the back frame portion so as to be able to provide a compact footprint for storage and or transport. By nesting the base frame and the back frame portions, the volume of the seating unit in the stowed form can be reduced by as much as 70%. When compared to conventional "single-piece" or fixed seating designs, this can provide significant savings for shipping and or mass storage.

As used herein, the term "chassis" means the base frame of a car, carriage, or other vehicle and includes a structural framework for a recreational or training simulator, such as a racing simulator or a flight simulator. Accordingly, the seating unit may be used in the adjustable rig of the first aspect.

An advantage provided by the seating unit lies in the rigid connection between the base frame portion and back frame portion. Such connection provides the two-piece seat frame in the operable configuration with substantially flex-free properties similar to a one-piece or unitary moulded shell, whilst maintaining the ability for the seat assembly to be compactly packaged, stored and/or shipped whilst in the stowed configuration.

In the operable configuration, the connection member may extend axially along a mid-section of the seat assembly so as to substantially align with the spine of a user seated therein. Where the connection member is arranged to align with the spine of the user, the seat assembly provides support directly thereto, further increasing the perceived rigidity of the seat assembly by a user seated therein.

In some embodiments, the connection member is formed as an angled elongate plate. The elongate plate may have a laterally extending bend disposed between the first and second support surfaces. The laterally extending bend may be disposed substantially half-way along the length of the elongate plate. The angle of the bend may be of a magnitude between about 20 and about 90 degrees. The upper part of the elongate plate (corresponding to the first support surface) is adapted to substantially align to the spine of the user when seated in a reclined position. The lower part of the elongate plate (corresponding to the second support surface) is adapted to substantially align with the pelvis and upper legs of the user when seated. Because the plate is of unitary construction, the rigidity thereof is maximised whilst manufacture thereof and subsequent assembly of the seat unit is simplified.

Alternatively, in other embodiments, the connection member may be an adjustable connection member that enables the back frame to be held at a variable inclination with respect to the base frame. The connection member may include a lockable hinge disposed between the first surface and the second surface to releasably hold the back-frame portion at a desired inclination with respect to the base frame portion. In such embodiments, the seat assembly may be moveable from the operable configuration to a folded configuration in which the back frame portion substantially faces towards the base frame portion. The adjustable connection member enables the user to select the angle if inclination, thereby providing a plurality of bespoke reclined positions. This enables such connection member to be used for a variety of applications. Further, because the hinge is a lockable hinge, the rigidity of the connection member in each selected position is not otherwise compromised.

The base frame portion and back frame portion may be formed as unitary shells.

In some embodiments, the base frame portion and the back frame portion may each include a predefined connection zone for respectively receiving the first and second surfaces of the connection member. The connection zones of the base frame portion and back frame portion may be bounded by a raised lip that projects from an inner face thereof. The connection zones of the base frame portion and the back frame portion and the first and second surfaces of the connection member may each include a plurality of preformed (such as pre-drilled) holes for receiving fasteners therein to thereby couple the connection member to the frame portions. By having predefined connection zones, assembly and/or disassembly of the seating unit is made easier for the user and/or a fabricator, whilst also ensuring that the components thereof are arranged correctly.

The base frame portion and the back frame portion may each include an attachment zone provided on or projecting from an outer face thereof and configured to secure the seat frame to the chassis. In some embodiments, the attachment zone is configured to engage with a seating module of the simulation rig.

In some embodiments, the seat assembly may further include: a removeable base cover section; and a removeable back cover section that is separate from the base cover section; wherein in the operable configuration of the seat assembly the connection member is disposed between and substantially concealed by the respective base and back cover and frame portions. In the stowed configuration the base cover section may be nested within the base frame portion and the back cover section is nested within the back portion. The base and back cover sections may each include at least one openable access flap that provides access to the connection plate, to enable coupling and uncoupling of the base and back frame portions therefrom. At least one of the base and back cover sections may comprise an inner padding section and an outer padding section, the respective inner and outer padding sections being removably attachable to one another. Because the cover sections are removeable from the seat frame, the seating unit can be provided with a plurality of different cover/padding arrangements to suit the preferred application. Such cover/padding arrangements can be interchangeably fitted by either a fabricator and/or the user.

The seating unit may further comprise a seating module for securing the seat frame upon the chassis, the seating module being configured to fixedly attach to the chassis and to provide positional adjustment of the seat frame relative thereto. The seating module may provide positional adjustment of the seat frames in three directions relative to a longitudinal axis of the chassis. The seating module provides a simple yet highly adjustable means for mounting the seat assembly to a chassis. This adjustability enables the seating unit to comfortably accommodate persons of differing stature and or phenotypes.

BRIEF DESCRIPTION OF THE DRAWINGS

Embodiments of the invention are illustrated by way of example, and not by way of limitation, with reference to the accompanying drawings, of which.

Figure 1:
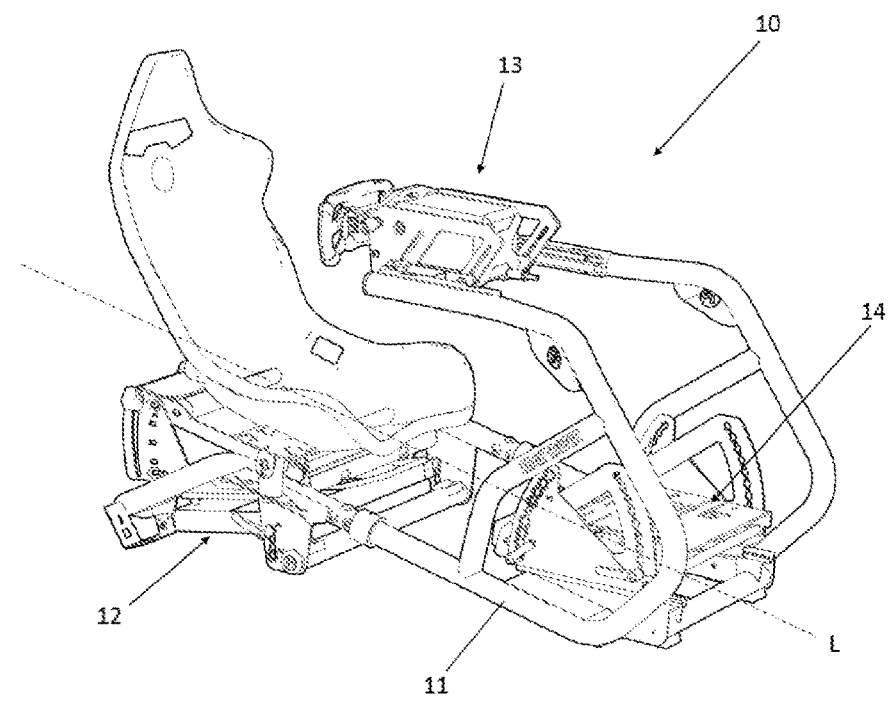
FIG. 1 is a perspective view of an embodiment of an adjustable rig for a racing simulator.

Embodiments will now be described more fully hereinafter with reference to the accompanying drawings, in which various embodiments, although not the only possible embodiments, of the invention are shown.

DETAILED DESCRIPTION

In general terms, FIGS. 1 to 9D show an embodiment of an adjustable rig 10 for a racing simulator and FIGS. 19 to 28 show another embodiment of an adjustable rig 10 for a racing simulator. These are not the only embodiments of the invention.

There are substantial similarities between the embodiments of the adjustable rig of FIGS. 1 to 9D and FIGS. 19 to 28 and the same reference numerals are used to describe the same structural features. There are differences between the two embodiments and these differences are pointed out in the following description.

With reference to FIGS. 1 to 9D and FIGS. 19 to 28, each rig 10 comprises a support frame 11, to which a plurality of modules is coupled. The modules include a seating module 12, a steering module 13 and a pedal module 14. Each of the modules 12, 13, 14 is adjustable in three directions relative to a longitudinal axis L of the support frame 11. Because of the adjustability of the modules 12, 13, 14, the rig 10 is suitable for use by users of differing stature and can accurately simulate the driving position of a wide range of racing vehicles.

In the following description, the arrangement of the components will be described with reference to their respective positions when used in-situ by a user of the rig 10. For clarity, the terms "proximal" and "distal" refer to the position of components with respect to the user when seated in the rig 10. That is, a "distal" end is further away from the user than the "proximal" end. Similarly, the terms "forward" and "rearward" and "front" and "rear" are used to describe respective ends of components, with the "forward" end being towards a pedal or foot end of the rig 10. Likewise, the terms "length" and "height" are used with respect to the seated user, with length referring to a generally horizontal direction away from and/or towards the user, and height referring to a perpendicular and generally vertical direction.

The Support Frame

Figure 2:
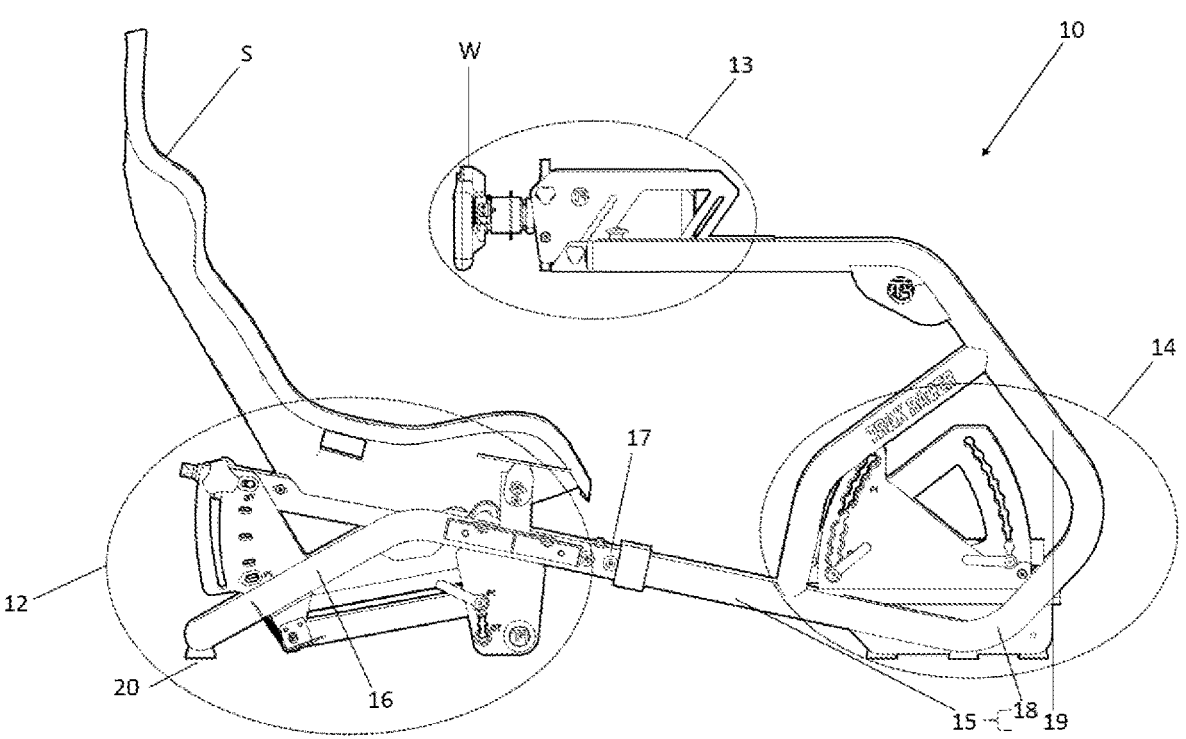
FIG. 2 is a side view of the adjustable rig of FIG. 1.

FIGS. 1 and 2 show an embodiment of the rig 10, in which each of the modules 12, 13, 14 is coupled to the support frame 11.

Figure 19:
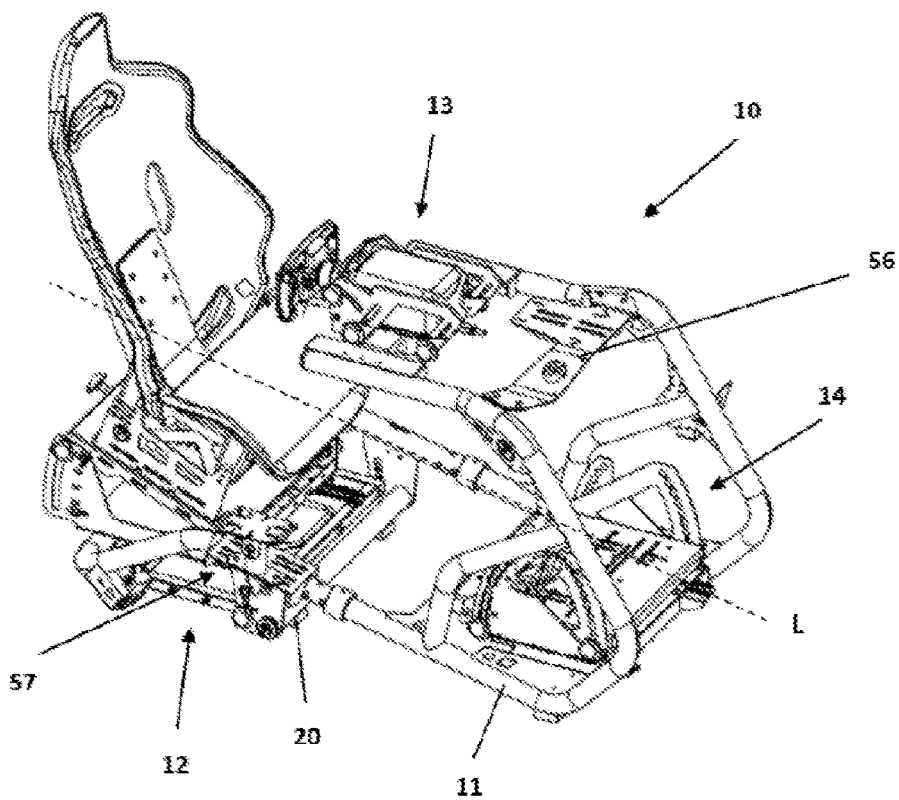
FIG. 19 is a perspective view of another embodiment of an adjustable rig for a racing simulator.
Figure 20:
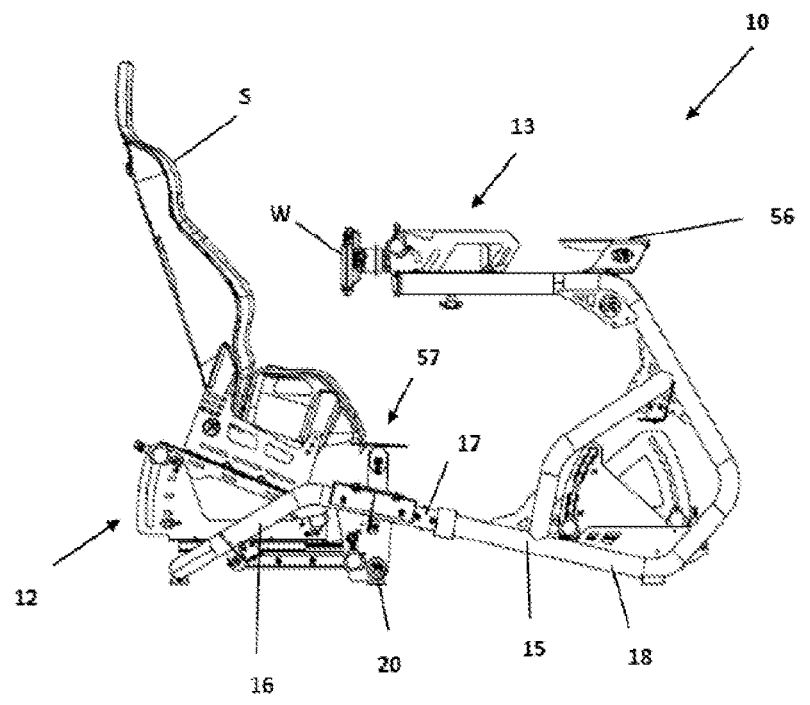
FIG. 20 is a side view of the adjustable rig of FIG. 19.

FIGS. 19 and 20 show another embodiment of the rig 10, in which each of the modules 12, 13, 14 is coupled to the support frame 11.

The support frame 11 of both embodiments comprises a pair of generally U-shaped side members 15. Each of the side members 15 extends parallel to each other, along the longitudinal axis L of the support frame 11. The side members 15 are spaced apart from one another, enabling at least the respective modules 13, 14 to be mounted therebetween.

In the embodiment of FIGS. 19 and 20, there is also a screen holder 56 for holding a screen such as a television or monitor. The screen holder 56 is another main member in the frame which holds the frame sides while the steering module 13 is unscrewed for adjusting. The screen holder 56 is located between the upper portions 19 of the side members 15.

A generally U-shaped base member 16 extends between the side members 15 at a proximal end thereof in both embodiments. The base member 16 extends generally transversely of the longitudinal axis L. The base member 16 is configured to extend along a ground or supporting surface upon which the rig 10 is situated.

In the embodiment of FIGS. 19 and 20, there is also a side mounting plate 57 attached to the base member 16. The side mounting plate 57 can be used for mounting handles such as shifters and hand brakes.

The base member 16 of both embodiments is adjustably connected to the respective side members 15. In the illustrated embodiment, each of the base member 16 and the side members 15 include longitudinally spaced, preformed mounting holes 17 adjacent the respective connecting ends thereof. In use, the respective mounting holes 17 of the base member 16 and each side member 15 may be overlapped and fixed in place by suitable fasteners to adjust an overall length of the support frame 11, and thus the rig 10, can be adjusted along its longitudinal axis. This adjustability allows the rig 10 to be adjusted for use by people of different stature.

As illustrated, the seating module 12 of both embodiments is fixedly coupled to the base member 16, towards a proximal end of the rig 10 via screws or other reversible means. It is understood, however, that depending on the geometry of the support frame 11, the seating module 12 could instead be coupled to the base member 16 and the side members 15, or, alternatively, between the side members 15 only.

Each side member 15 comprises a lower portion 18 and an upper portion 19. The lower portion 18 is configured to extend along the ground surface. The pedal module 14 is fixedly couplable to a distal end of the lower portion 18 of the side member 15 via screws or other reversible means.

The distal end of the lower portion 18 is the end that is spaced away from the seating module 12, which represents the proximal end.

The steering module 13 of both embodiments is connected to the upper portion 19 of each side member 15. The steering module 13 is generally disposed between the seating module 12 and pedal module 14, with respect to the longitudinal axis L of the support frame 11. It is understood, however, that the respective adjustability of the modules mean that the each of the modules can be moved along the longitudinal axis with respect to each other, which may alter this general configuration.

It is envisaged that the side members 15 and base member 16 of both embodiments are made from rigid tubing. The tube members may be made from a suitable material and may comprise metal tube members or polymeric tube members. Alternatively, the tube members may be made from a composite material. Importantly, the tube members have sufficient strength and rigidity to support each of the modules 12, 13, 14 and the weight of a user.

Optionally, feet 20 may be attached to lowermost portions of the base member 16 and/or the side members 15 of both embodiments. The feet 20 are plastic friction members that provide an anti-slip surface to prevent or reduce the tendency of the rig 10 to move. The feet 20 may also provide a shock absorbing effect to reduce a rocking motion of the rig 10 when the user shifts their weight during use.

The Seating Module

Figure 3:
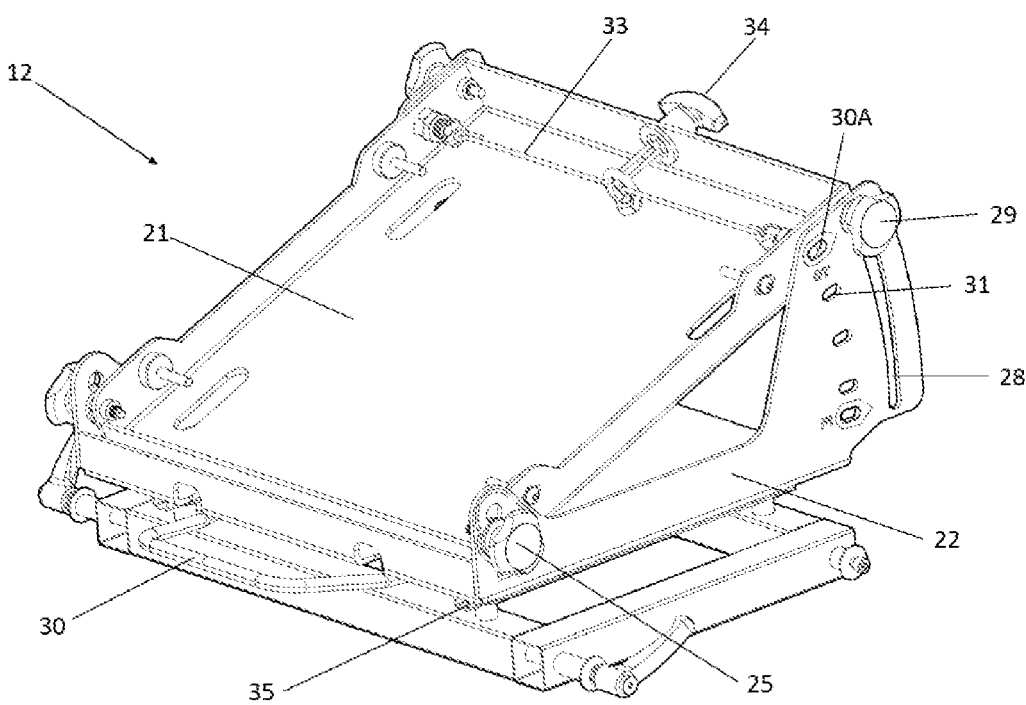
FIG. 3 is a perspective view of a seating module couplable to the adjustable rig of FIG. 1.
Figure 4:
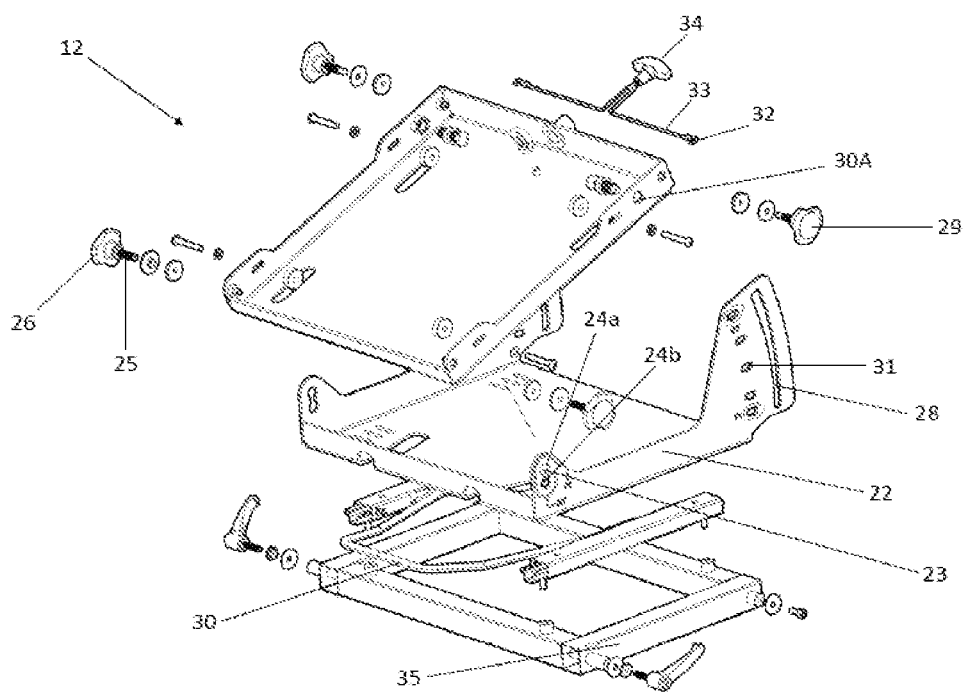
FIG. 4 is an exploded view of the seating module of FIG. 3 illustrating components thereof.
Figure 21:
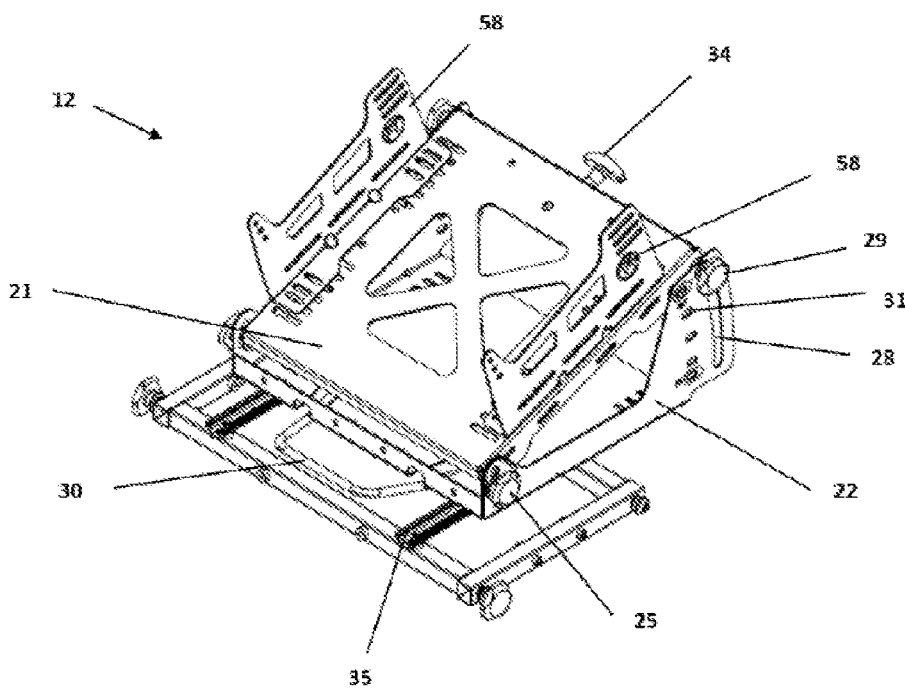
FIG. 21 is a perspective view of a seating module couplable to the adjustable rig of FIG. 19.
Figure 22:
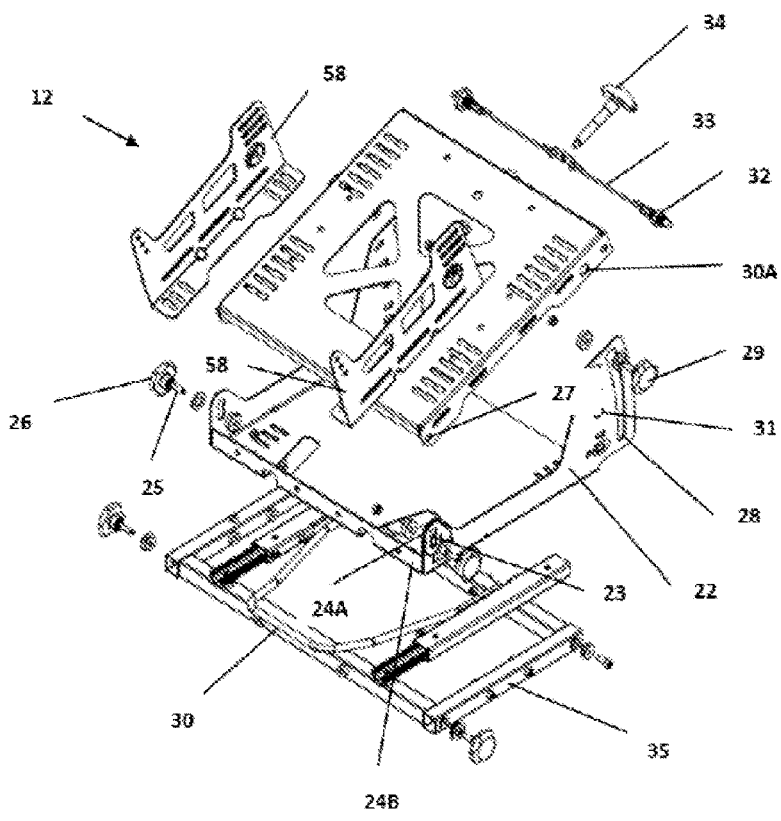
FIG. 22 is an exploded view of the seating module of FIG. 21 illustrating components thereof.

The seating module 12 of both embodiments is configured to support a seat S, within which the user of the rig 10 sits. FIGS. 3 and 4 show an embodiment of the seating module 12, which is removably couplable to the support frame 11. FIGS. 21 and 22 show another embodiment of the seating module 12, which is removably couplable to the support frame 11.

The seating module 12 of both embodiments includes a mounting member 21 in the form of a mounting plate 21 (hereinafter referred to as "seating module mounting plate 21"). The seating module mounting plate 21 provides a mounting surface that is configured to support the seat S of the user of the rig 10. Whilst illustrated and described herein as a plate, it is understood that the seating module mounting plate 21 could be otherwise configured, for example, as a curved surface or as a pair of bars.

All that is required is that the seating module mounting plate 21 provides a supporting surface for the seat S. A position of the seating module mounting plate 21 with respect to the support frame 11 is adjustable in three directions. That is, the seating module mounting plate 21 can be adjusted by the user in: (i) a lengthwise direction, substantially parallel to the longitudinal axis L of the support frame 11; (ii) a height direction, substantially perpendicular to the longitudinal axis L of the support frame 11; and (iii) in an angular direction, between a substantially horizontal orientation parallel to the longitudinal axis L, towards a substantially vertical orientation. In the illustrated embodiments the range of angular or tilt adjustment is approximately 30 degrees, however it is understood that this can be greater.

In the embodiment of FIGS. 21 and 22, the seating module mounting plate 21 also has seat brackets 58 for attaching to the seat S. In this embodiment the seating module mounting plate 21 is inverted and has holes to accommodate for the seat brackets 58, which provides means for adjusting the position of seat S along the length of the face of the seating module mounting plate 21.

The seating module mounting plate 21 of both embodiments is supported by a support assembly. In the embodiment shown, the support assembly comprises a pair of brackets 22 (hereinafter referred to a "seating module brackets 22"). The seating module brackets 22 are laterally disposed on respective opposing sides of the seating module mounting plate 21. The support assembly supports and provides adjustability of the position of the seating module mounting plate 21 in both the height and angular directions. The seating module brackets 22 are generally L shaped brackets, attached at both the front and rear ends thereof to the seating module mounting plate 21.

A first positioning arrangement of both embodiments, including preformed recesses 24 (hereinafter referred to as seating module recesses 24a, 24b), is disposed towards the front or forward end of the seating module brackets 22. The first positioning arrangement of both embodiments includes laterally spaced slots 23 that each comprise two preformed seating module recesses 24a, 24b. Each slot 23 is an elongate slot, extending in a generally upright direction. The preformed recesses comprise an upper recess 24a, and a lower recess 24b and are disposed at either end of each slot 23. However, it is to be understood that greater than two recesses may be provided along the slot 23, if desired. The seating module recesses 24a, 24b have an enlarged diameter with respect to a width of the slot 23. The preformed seating module recesses 24a, 24b represent set positions, within which a bolt or fastening member 25 can be secured.

In use, the fastening member 25 of both embodiments is inserted by the user into one of the seating module recesses 24a, b, and into a receiving hole 27 of the seating module mounting plate 21, to form an adjustable connection therebetween. The fastening member 25 includes a manually adjustable knob 26. By manually adjustable, what is meant is that the user can easily and directly tighten and loosen the fastening member 25 by hand without the need for tools and the like. Tightening the fastening member 25 results in a frictional fit, locking or otherwise holding the seating module mounting plate 21 at a given/desired orientation. Accordingly, it is understood that by loosening the fastening member 25 and changing the respective recess 24a, b through which the fastening member 25 may be secured, the angle of the seating module mounting plate 21 can be adjusted, with the connection between the seating module mounting plate 21 and bracket 22 at the rear end thereof acting as a pivot point. For example, with the seating module mounting plate 21 pivotably fixed to the rear end of the bracket 22, moving the fastener 25 into the upper of the two seating module recesses 24a will reduce the angle of tilt of the seating module mounting plate 21 with respect to the seating module brackets 22. This will result in the seating module mounting plate 21 having an orientation that is at a relatively low angle to horizontal, for example when the rig is in a recumbent, "Formula 1" orientation. Conversely, moving the fastener 25 into the lower of the two seating module recesses 24b will increase the angle of tilt of the seating module mounting plate 21 with respect to the seating module brackets 22. This will result in the seating module mounting plate 21 having an orientation that is at a relatively high angle to horizontal, for example when the rig is in an upright seating position of tin-top or "GT" racing vehicles. The seating module recesses 24 thus represent discrete adjustment positions or increments of the seating module 12. It is understood, however, that continuous adjustability of the seating module 12 is also contemplated.

Each bracket 22 of both embodiments also includes a second positioning arrangement disposed towards the rear end thereof. The second positioning arrangement includes a plurality of apertures 31 that extend adjacent to a second slot

28 (hereinafter referred to as "seating module second slot 28"). In the illustrated embodiment there are six such apertures 31. The apertures 31 are arranged generally arcuately about the pivot point provided by the connection provided by the first positioning arrangement between the seating module mounting plate 21 and bracket 22 at the front end thereof. The apertures 31 are analogous to the seating module recesses 24 of the seating module first slot 23, that is they represent discrete set adjustment positions of the seating module mounting plate 21.

Each of the apertures 31 of both embodiments is configured to receive a detent 32. The detents 32 are spring loaded detents, each being attached to a spring member 33 that extends between the respective seating module brackets 22. The spring member 33 is operably connected to an actuator 34 in the form of a manually adjustable lever. By rotating the lever, the spring member 33 applies an inwardly acting force onto each of the detents 32, thereby retracting the detents simultaneously from the respective apertures 31. The user can then adjust the tilt angle of the seating module mounting plate 21, before releasing the lever, whereby the detents are inserted into another of the apertures 31.

Each of the seating module second slot 28 of both embodiments is provided towards the rear end of the seating module brackets 22, outwardly of the plurality of apertures 31. The seating module second slot 28 is an elongate, arcuate slot, through which a second fastener 29 is receivable. The seating module second slot 28 extends in an arcuate path that is substantially parallel to the arrangement of apertures 31.

In use, the second fastening member 29 of both embodiments is inserted by the user into the seating module second slot 28, and into a receiving hole 30A of the seating module mounting plate 21, to form the pivoting connection about which the first positioning arrangement is pivotable. By tightening the fastening member 29, a friction fit is formed, locking or otherwise holding the seating module mounting plate 21 at a given angular position.

Accordingly, for both embodiments it is understood that by loosening the fastening member 29 and repositioning the detents 32 into different apertures 31, while maintaining the position of the fastening member 25 the angle of the seating module mounting plate 21 with respect to the longitudinal axis of the support member 11 can be adjusted. Furthermore, it is to be understood that the combined action of both the first and second positioning arrangements provide height adjustability of the seating module mounting plate 21, for a given angle of tilt. For example, the overall height of the seating module mounting plate 21 can be increased without changing the angle of tilt, via adjustment of engagement of the seating module recesses 24a, 24b and the apertures 31, respectively, of both the first and second positioning arrangements.

Figure 9A:
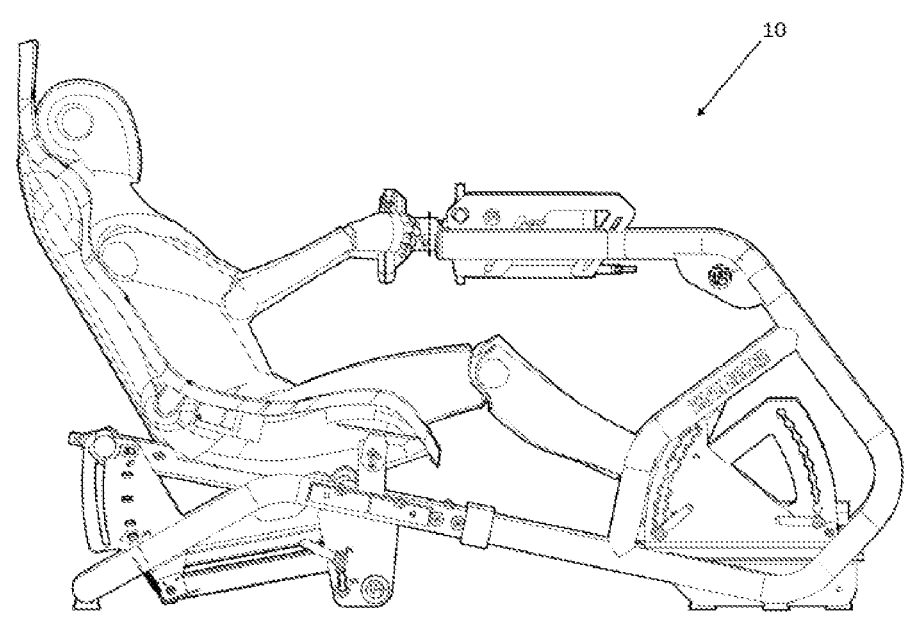
FIG. 9A is side view of the adjustable rig of FIG. 1, illustrating the rig in a first upright configuration.
Figure 9B:
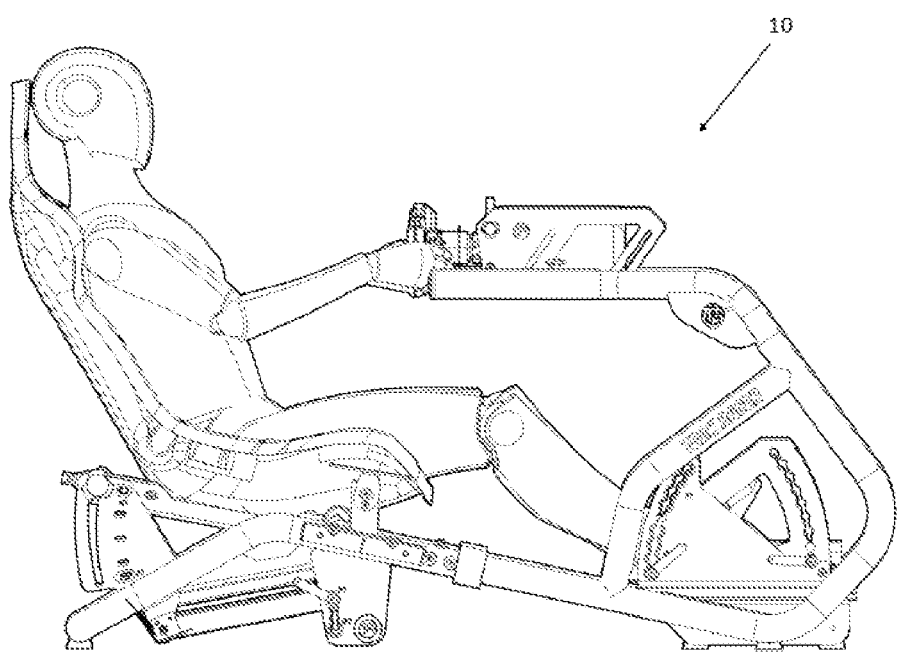
FIG. 9B is side view of the adjustable rig of FIG. 1, illustrating the rig in a second upright configuration.
Figure 9C:
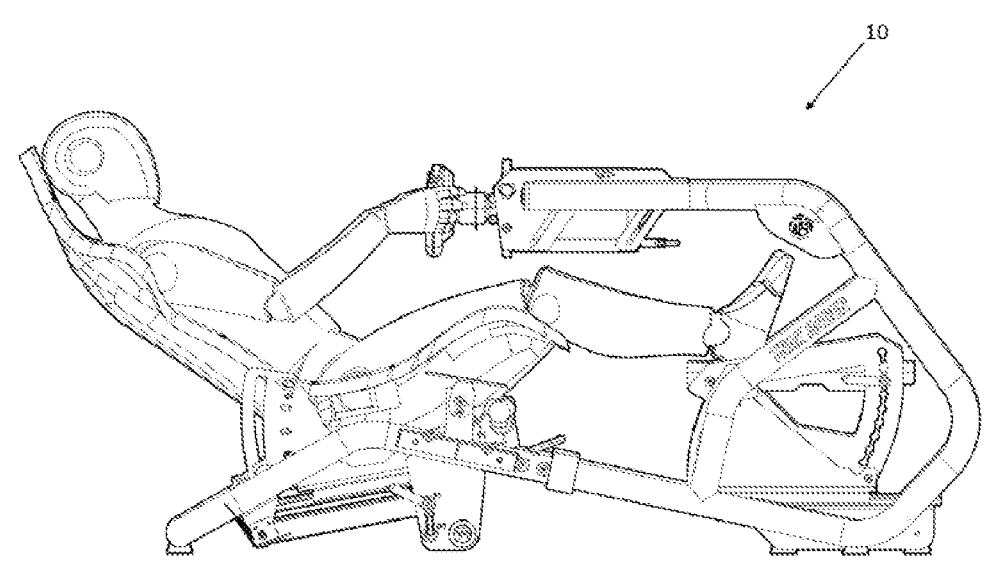
FIG. 9C is side view of the adjustable rig of FIG. 1, illustrating the rig in a first recumbent configuration.
Figure 9D:
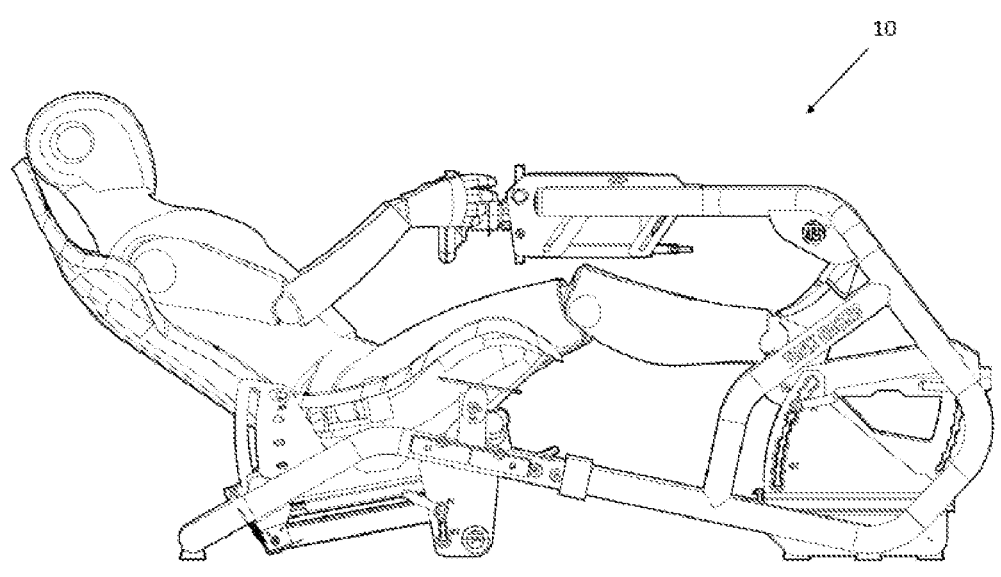
FIG. 9D is side view of the adjustable rig of FIG. 1, illustrating the rig in a second recumbent configuration.

Optionally, each aperture 31 and/or each recess 24 of both embodiments can be labelled with an identifier. The identifier can indicate to the user a specified or predetermined configuration of the rig 10. For example, a recumbent configuration (as shown in FIGS. 9C and 9D) may be preconfigured to replicate a driving position for formula style racing cars, whereas an upright configuration (shown in FIGS. 9A and 9B) may be preconfigured to replicate the driving position for tin-top or GT racing cars. With regards to the angle of the seating module mounting plate 21, the upright configuration may see the seating module mounting plate 21 held in a substantially horizontal position, whereas the recumbent configuration may see the seating module mounting plate 21 held in a downward leaning position, towards the ground plane.

The support assembly of both embodiments is fixedly attached to a pair of slide rails 35 (hereinafter referred to as "seating module slide rails 35"). The seating module slide rails 35 are lateral slide rails, in that they are located on opposing sides of the support frame 11—i.e. adjacent to the respective side members 15. Each slide rail 35 extends along the longitudinal axis, to thereby provide positional adjustment of the connected seating module brackets 22 and supported seating module mounting plate 21 in a lengthwise direction. For example, the seating module mounting plate 21 can be moved towards the proximal or rear end of the support frame 11, away from the pedal module 14, to thereby cater for users of greater height. In the illustrated embodiment, this lengthwise adjustment is performed by the user operating an actuator 30. The actuator 30 is a U-shaped lever which extends between the seating module slide rails 35, and projects forward from the front of the seating module 12. In use, the lever lifts upwardly on the actuator 30, which releases the seating module slide rails 35, enabling the seating module mounting plate 21 to be slid forwards and rearwards with respect to the support assembly 11. Upon releasing the lever, the seating module slide rails 35 become locked in position, such that the mounting plate is firmly held in the desired longitudinal position. Such lengthwise adjustment can be seen by comparing, for example, the upright configurations illustrated in FIGS. 9A and 9B. FIG. 9A has the seating module mounting plate 21 in a forward position, towards the distal end of the support frame 11, whilst FIG. 9B has the mounting plate in a rearward position, towards the proximal end of the support frame 11. The configuration shown in FIG. 9B is best suited to users of taller stature, whilst the configuration shown in FIG. 9A is best suited for users of shorter stature.

The Steering Module

Figure 5:
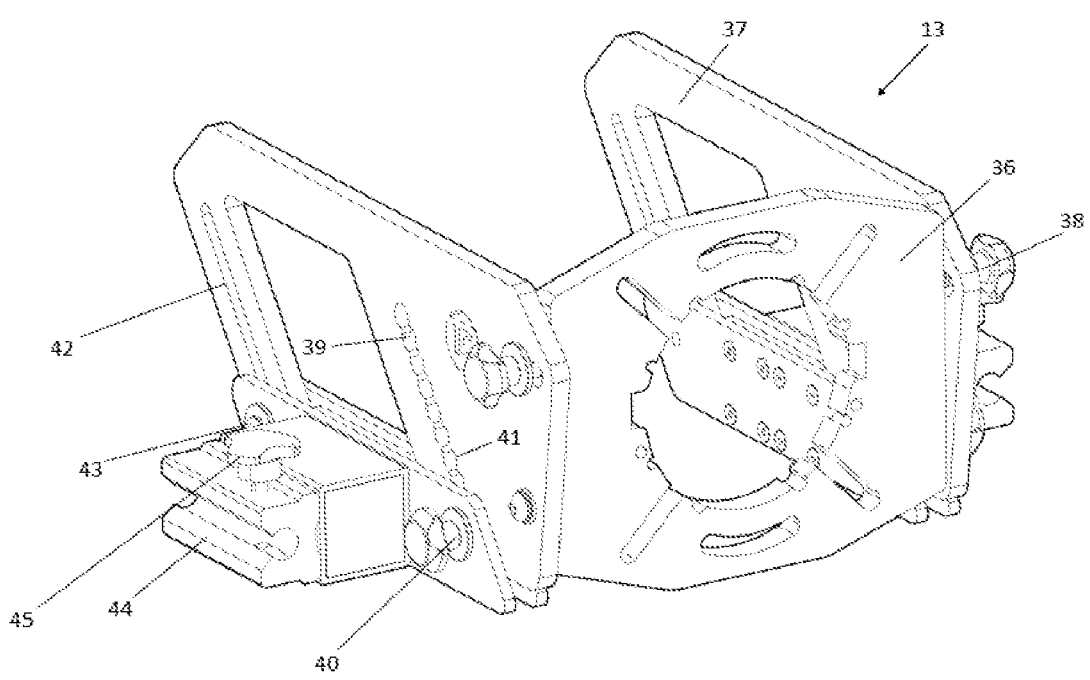
FIG. 5 is a perspective view of a steering module couplable to the adjustable rig of FIG. 1.
Figure 6:
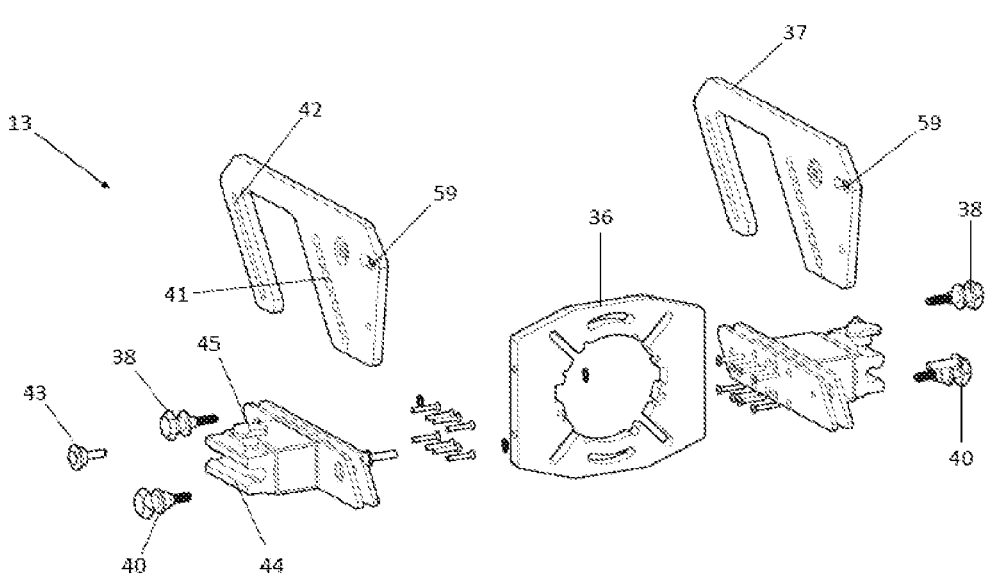
FIG. 6 is an exploded view of the steering module of FIG. 5 illustrating components thereof.
Figure 23:
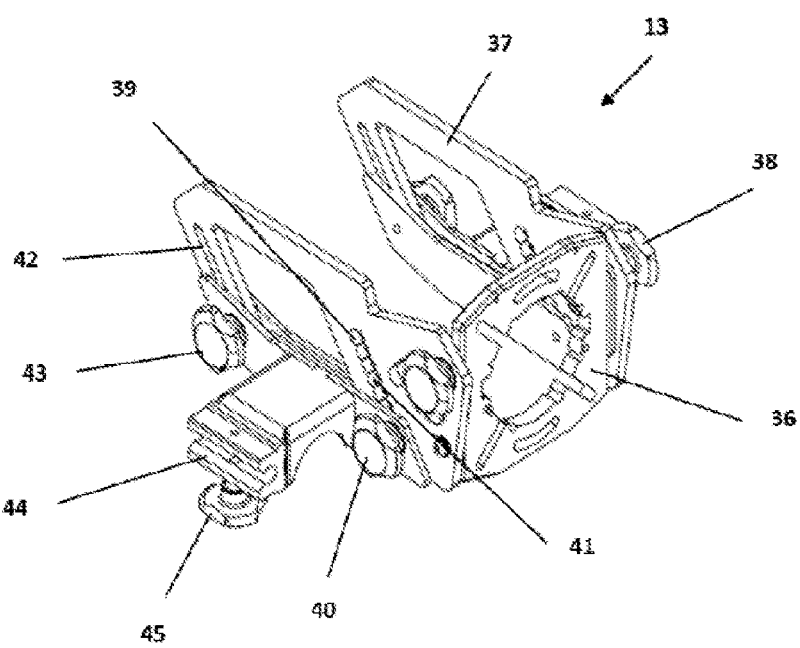
FIG. 23 is a perspective view of a steering module couplable to the adjustable rig of FIG. 19.
Figure 24:
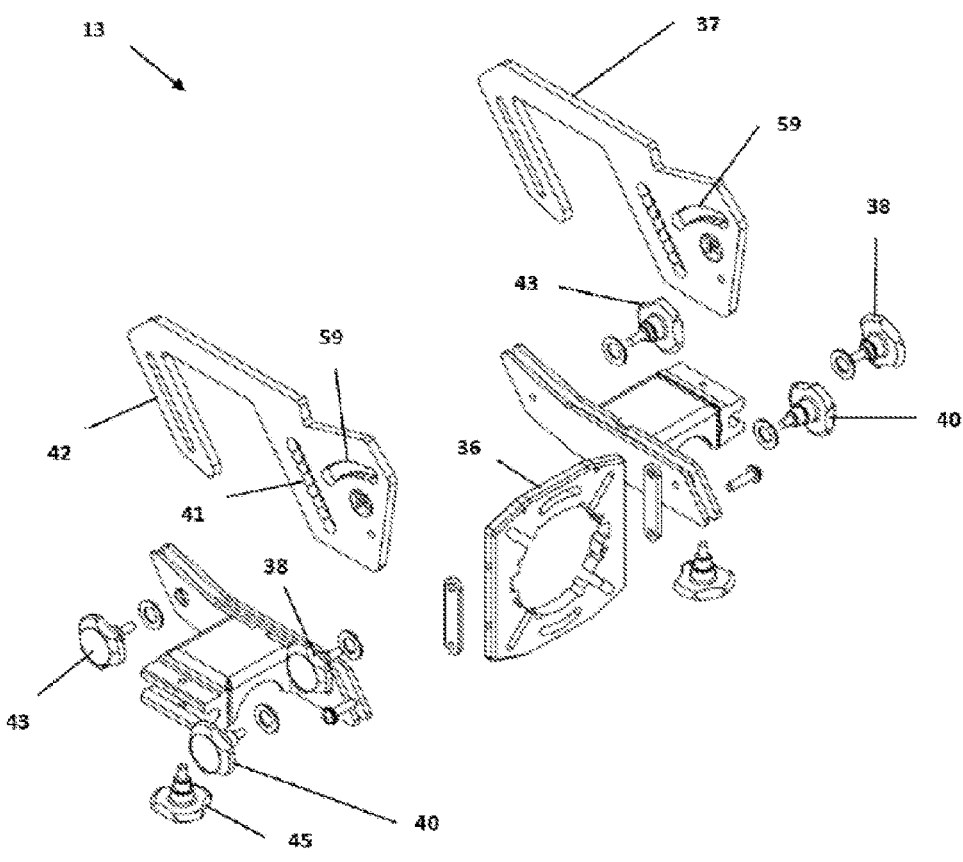
FIG. 24 is an exploded view of the steering module of FIG. 23 illustrating components thereof.

The steering module 13 of both embodiments is configured to support a steering wheel W, which the user of the rig 10 uses to control/steer the simulated vehicle. FIGS. 5 and 6 show an embodiment of the steering module 13, which is removably couplable to the support frame 11. FIGS. 23 and 24 show another embodiment of the steering module 13, which is removably couplable to the support frame 11.

Like the seating module 12 of both embodiments, the steering module 13 of both embodiments includes a mounting plate 36, which is hereinafter referred to as "steering module mounting plate 36". The steering module mounting plate 36 provides a mounting surface that is configured to support the wheel W. The position of the steering module mounting plate 36 with respect to the support frame 11 is adjustable in the lengthwise, height, and angular directions. In the illustrated embodiment the range of angular or tilt adjustment is approximately 90 degrees (between a horizontal or bus-like position to a vertical or formula-style position), however it is understood that this can be less.

The steering module mounting plate 36 of both embodiments is held between a pair of steering module brackets 37. The steering module brackets 37 provide adjustability of the position of the steering module mounting plate 36 in both the height and angular directions. The steering module brackets 37 are U shaped brackets, each attached at a proximal end thereof to the steering module mounting plate 36.

The steering module mounting plate 36 of both embodiments is hingedly attached between the steering module brackets 37 by a fastening element 38. The fastening element 38 is a manually adjustable fastening member. The fastening element 38 provides a frictional fit between the steering module brackets 37 and steering module mounting plate 36. Accordingly, by loosening the respective fastening elements 38, the user may adjust the angle of tilt of the steering module mounting plate 36. Once a desired angle of tilt is achieved, the user may tighten the fastening elements 38, thereby securing mounting plate 36 and the wheel W supported thereby in the desired position.

In the embodiment of FIGS. 23 and 24 the steering module third slot 59 allows for a greater range of the angle of tilt of the steering module mounting plate 36.

Each bracket 37 of both embodiments includes a positioning arrangement to provide height adjustment to the position of the steering module mounting plate 36. The positioning arrangement includes a plurality of preformed recesses 39 (hereinafter referred to as "steering module recesses 39") that represent set positions, within which a manually adjustable fastening member 40 can be secured. The preformed steering module recesses 39 are disposed towards the proximal end of the steering module brackets 37. The preformed steering module recesses 39 are disposed along a first slot 41 (hereinafter referred to as "steering module first slot 41"). The steering module recesses 39 have an enlarged diameter with respect to a width of the first slot 40.

The positioning arrangement of both embodiments further includes a second slot 42 (hereinafter referred to as "steering module second slot 42") disposed towards the distal end. Each slot 41, 42 is an elongate slot, extending substantially parallel to one another in a diagonal direction, angled in upwardly and distally. The slots 41, 42 together provide height adjustment to the position of the steering module mounting plate 36.

In use, the fastening member 40 of both embodiments is inserted by the user into one of the recesses 40 and into a corresponding receiving hole of the steering module mounting plate 36. A second fastening member 43 is inserted into the elongate steering module second slot 42, and into a corresponding hole of the mounting plate.

Tightening the respective fastening members 40, 43 results in a frictional fit, locking or otherwise holding the steering module mounting plate 36 at a given height with respect to the support frame 11.

Accordingly, for both embodiments it is understood that by loosening and changing the respective recess 40 within which the fastening member 40 is secured and loosening and sliding the fastening member 43 within the steering module second slot 42, the height of the steering module mounting plate 36 can be adjusted.

Each of the steering module brackets 37 of both embodiments is fixedly attached to a pair of slide rails 44 (hereinafter referred to as "steering module slide rails 44"). The steering module slide rails 44 are lateral slide rails, in that they are located on opposing sides of the support frame 11—i.e. adjacent to the respective side members 15 (when the rig 10 is assembled). Each slide rail 44 extends along the longitudinal axis, to thereby provide positional adjustment of the connected steering module brackets 37 and supported steering module mounting plate 36 in a lengthwise direction. This adjusts the lengthwise distance between the wheel W and the user seated in the rig 10. Thus, by sliding the mounting plate towards the distal end of the support frame, the distance between the wheel W and the user is increased, to better suit users of greater stature. Optionally, each slide rail includes a quick adjustment mechanism in the form of a manually adjustable set screw 45. By loosening the set screw 45, the steering module slide rails 44 can be slid freely along the longitudinal axis L of the support frame 11. Once in a desired ergonomic position, that is a position that is comfortable and appropriate for the user, the set screw 45 can be tightened, securing the wheel W in a set longitudinal position.

In the embodiment of FIGS. 23 and 24, the set screw 45 is underneath the slide rails 44, allowing for easier access to the set screw 45 by the user.

The Pedal Module

Figure 7:
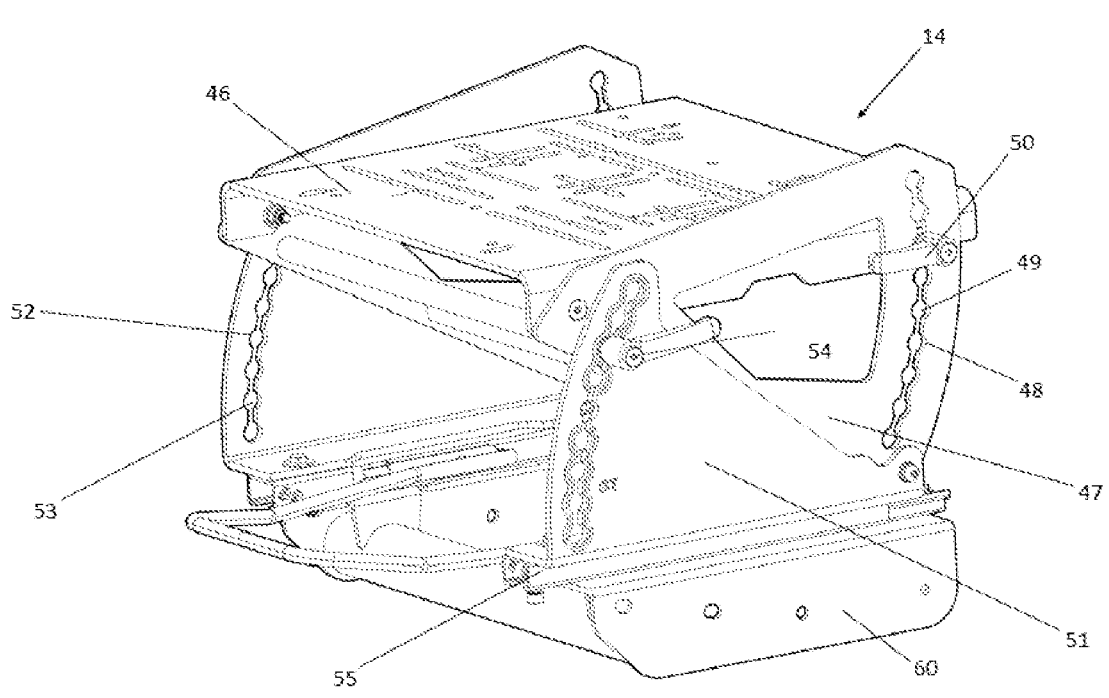
FIG. 7 is a perspective view of a pedal module couplable to the adjustable rig of FIG. 1.
Figure 8:
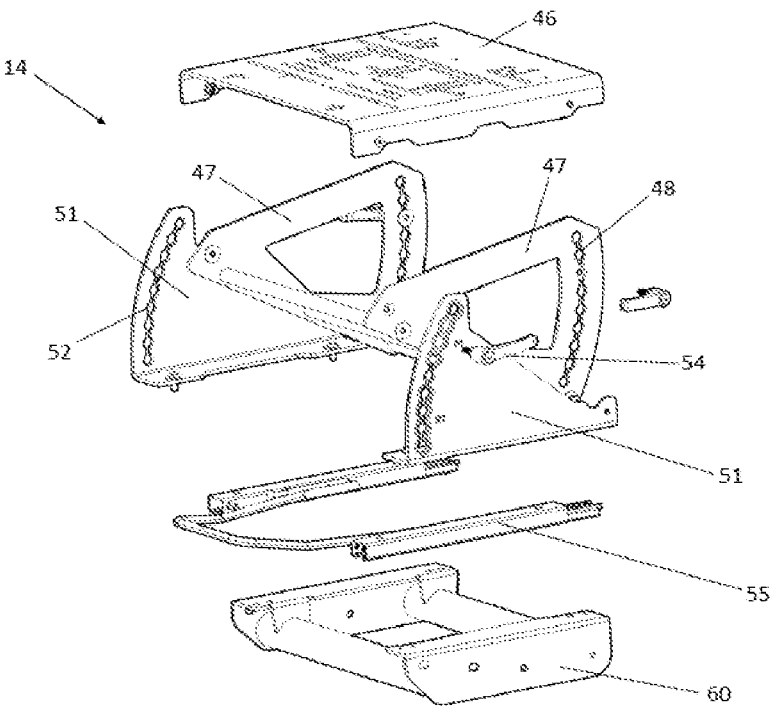
FIG. 8 is an exploded view of the pedal module of FIG. 7 illustrating components thereof.
Figure 25:
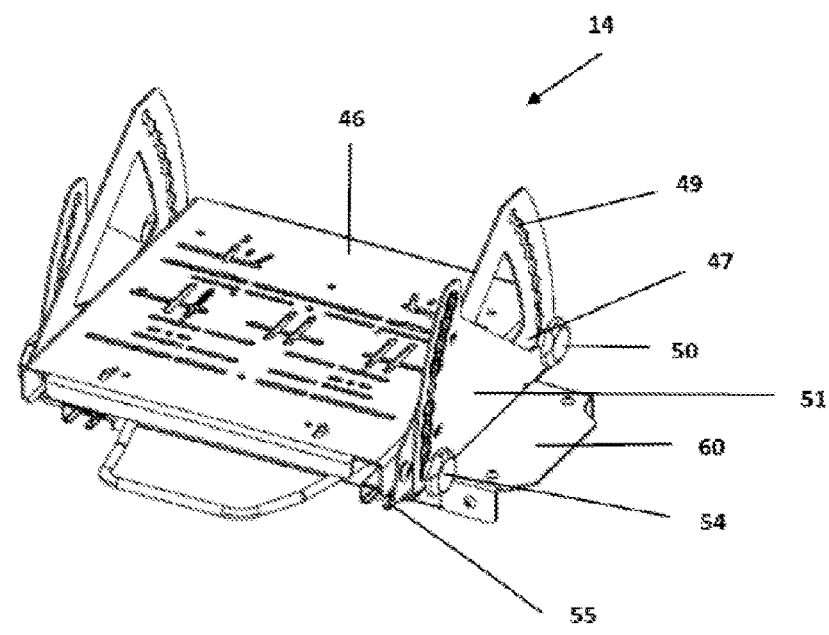
FIG. 25 is a perspective view of a pedal module couplable to the adjustable rig of FIG. 19.
Figure 26:
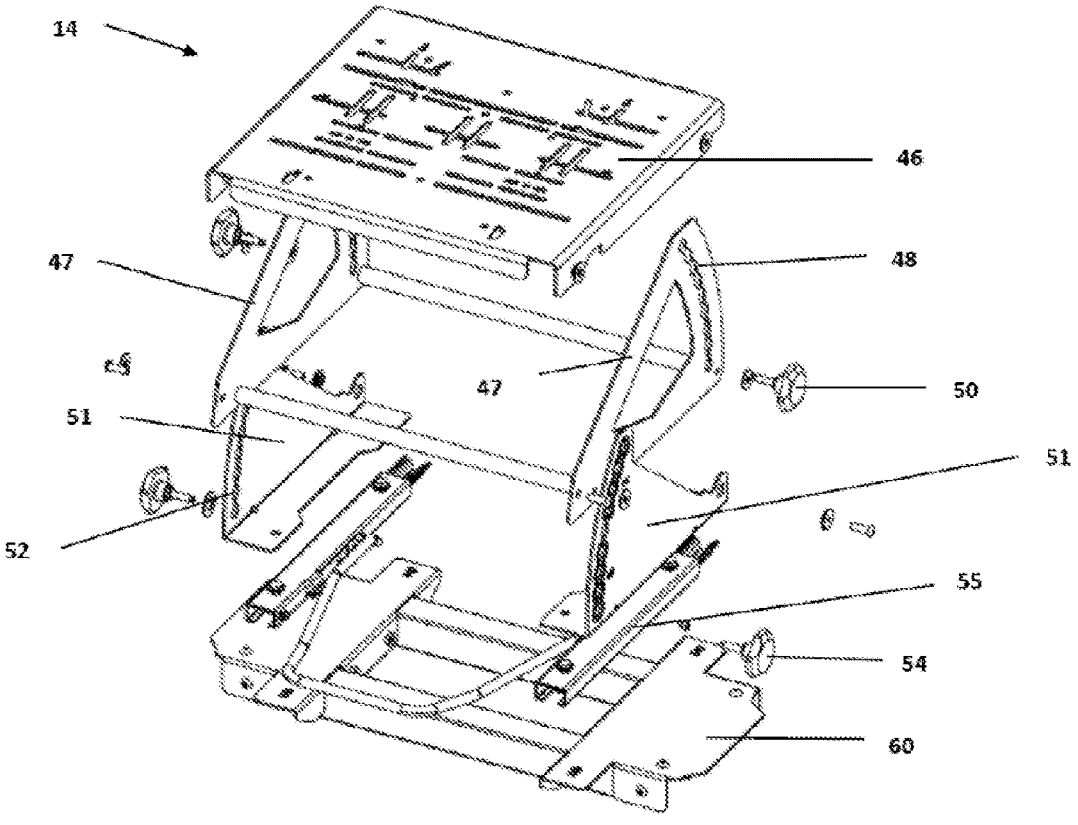
FIG. 26 is an exploded view of the pedal module of FIG. 25 illustrating components thereof.
Figure 27:
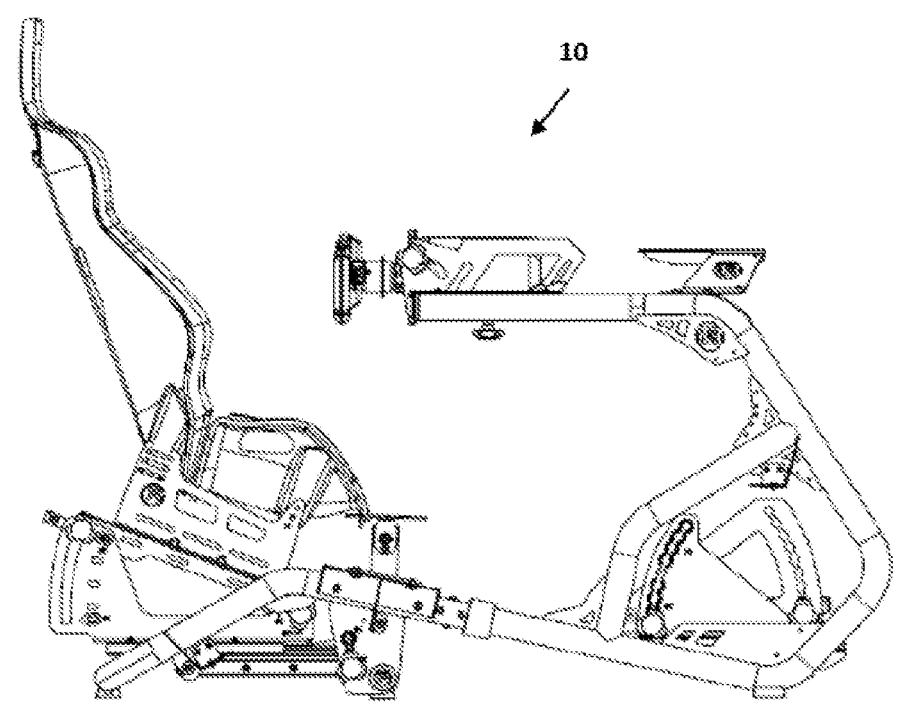
FIG. 27 is side view of the adjustable rig of FIG. 19, illustrating the rig in an upright configuration.
Figure 28:
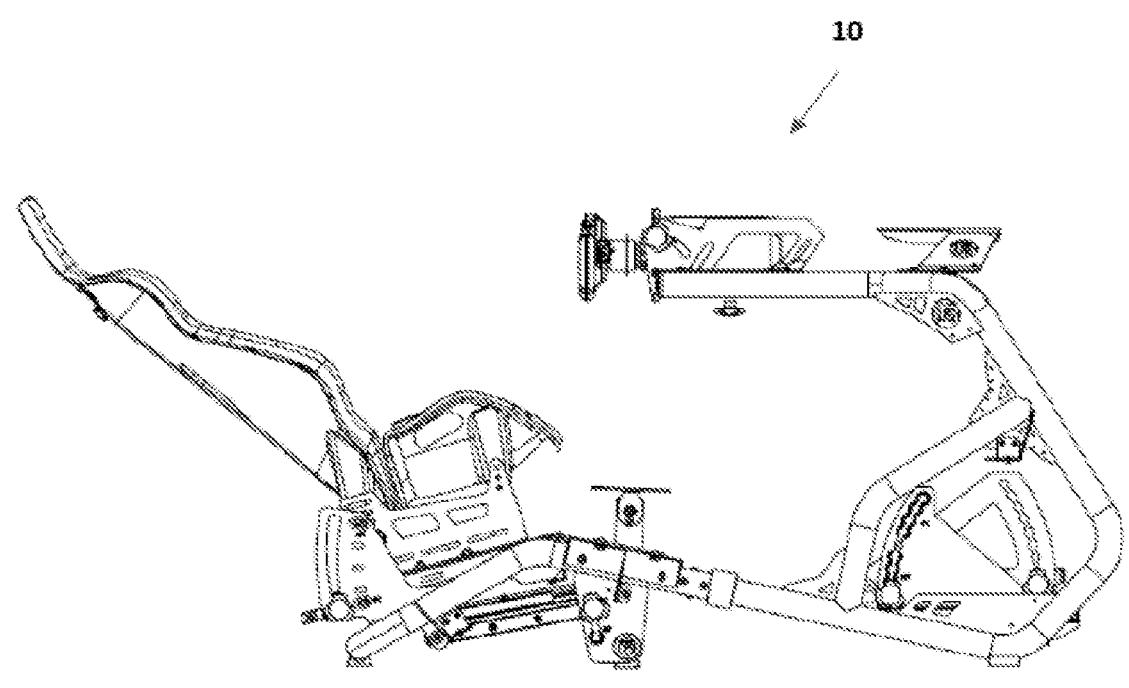
FIG. 28 is side view of the adjustable rig of FIG. 19, illustrating the rig in a recumbent configuration.

The pedal module 14 of both embodiments is configured to support a set of pedals P (not shown), which the user of the rig 10 uses as an input for controlling the simulated vehicle. FIGS. 7 and 8 show an embodiment of the pedal module 14, which is removably couplable to the support frame 11. FIGS. 25 and 26 show another embodiment of the pedal module 14, which is removably couplable to the support frame 11.

Like the seating module 12 and steering module 13 of both embodiments, the pedal module 14 of both embodiments includes a mounting plate 46 (hereinafter referred to as "pedal module mounting plate 46"). The pedal module mounting plate 46 provides a mounting surface that is configured to support the pedals P. The position of the pedal module mounting plate 46 with respect to the support frame 11 is adjustable in the lengthwise, height, and angular directions. In the illustrated embodiment the range of angular or tilt adjustment is approximately 45 degrees, however it is understood that this can be less.

The pedal module mounting plate 46 of both embodiments is supported by a support assembly including an inner pair of brackets 47 and an outer pair of brackets 51.

The pedal module base 60 of both embodiments secures the pedal module 14 to the support frame 11.

The inner pair of brackets 47 of both embodiments provide adjustability of the angular orientation of the pedal module mounting plate 46 with respect to the support frame 11. The brackets 47 are generally triangular shaped brackets, each of which is pivotably attached at a distal end and a proximal end thereof to the pedal module mounting plate 46.

A plurality of preformed recesses 49 are disposed along a distal end of the brackets 47 of both embodiments. The preformed recesses 49 represent set positions, within which a manually adjustable fastening member 50 can be secured. The recesses 49 are disposed along a slot 48. The slot 48 is an arcuate slot, extending in a generally vertical plane. The recesses 49 have an enlarged diameter with respect to a width of the slot 48.

The fastening member 50 of both embodiments provides a frictional fit between the brackets 47 and pedal module mounting plate 46. Accordingly, by loosening the respective fastening members 50, the user may adjust the angle of tilt of the pedal module mounting plate 46. Once a desired angle of tilt is achieved, the user may tighten the fastening members 50, thereby securing pedal module mounting plate 46 and the pedals P supported thereby in the desired position.

The outer pair of brackets 51 of both embodiments is arranged laterally outer of the inner brackets 47. In this way, the inner brackets 47 are nested between the outer brackets 50 and the pedal module mounting plate 46. The outer brackets 51 are configured and arranged in a substantially mirror-like fashion to that of the inner brackets 47. That is, the outer brackets 51 are pivotably attached to the pedal module mounting plate 46 at a proximal end thereof.

The outer brackets 51 of both embodiments also include a plurality of preformed recesses 53 that are disposed along the proximal end of the brackets 51. The preformed recesses 53 represent set positions, within which a manually adjustable fastening member 54 can be secured. The recesses 53 are disposed along an arcuate slot 52, the arcuate slot 52 being disposed at the proximal end of the outer brackets 51.

The outer brackets 51 of both embodiments are pivotally attached at proximal and distal ends thereof to the inner pair of brackets 47. Specifically, the connection at the distal end acts as a pivot point about which the inner brackets 47 can be rotated with respect to the outer brackets 51. This rotational adjustment provides a further range of angular adjustment of the pedal module mounting plate 46. The connection between the inner and outer brackets 47, 51 at the proximal ends is via the manually adjustable fastener 54. The fastener 54 is inserted through the slot 52 of the outer bracket 51 and received within a corresponding hole within the inner bracket 47.

In use of both embodiments, the user can further adjust the orientation of the pedal module mounting plate 46 with respect to the support frame 11 via the fasteners 50 and 54. Furthermore, by loosening both fasteners 50 and 54 simultaneously, the height of the pedal module mounting plate 46 can be adjusted. Optionally, each recess 49, 53 can be labelled with an identifier. The identifier can indicate to the user a specified or predetermined configuration of the rig 10.

The support assembly of both embodiments is fixedly attached to a pair of slide rails 55 (hereinafter referred to as "pedal module slide rails 55"), such as by each of the outer brackets 51. The pedal module slide rails 55 are lateral slide rails, in that they are located on opposing sides of the support frame 11—i.e. adjacent to the respective side members 15. Each slide rail 35 extends along the longitudinal axis, to thereby provide positional adjustment of the connected brackets 51 and thus supported pedal module mounting plate 46 in a lengthwise direction.

In the embodiment of FIGS. 25 and 26, the pedal module base 60 has a wider shape, providing greater structural stability to withstand a greater load with less flex.

The Seating Unit

Figure 16:
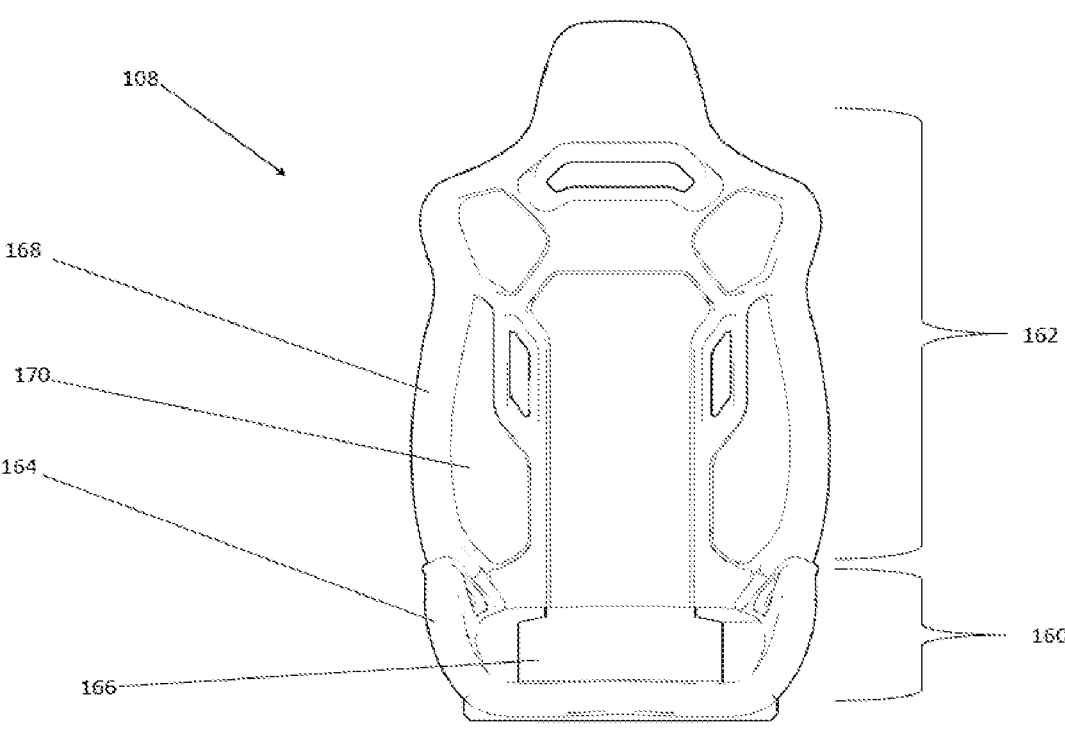
FIG. 16 is a front view of the seat cover.
Figure 17:
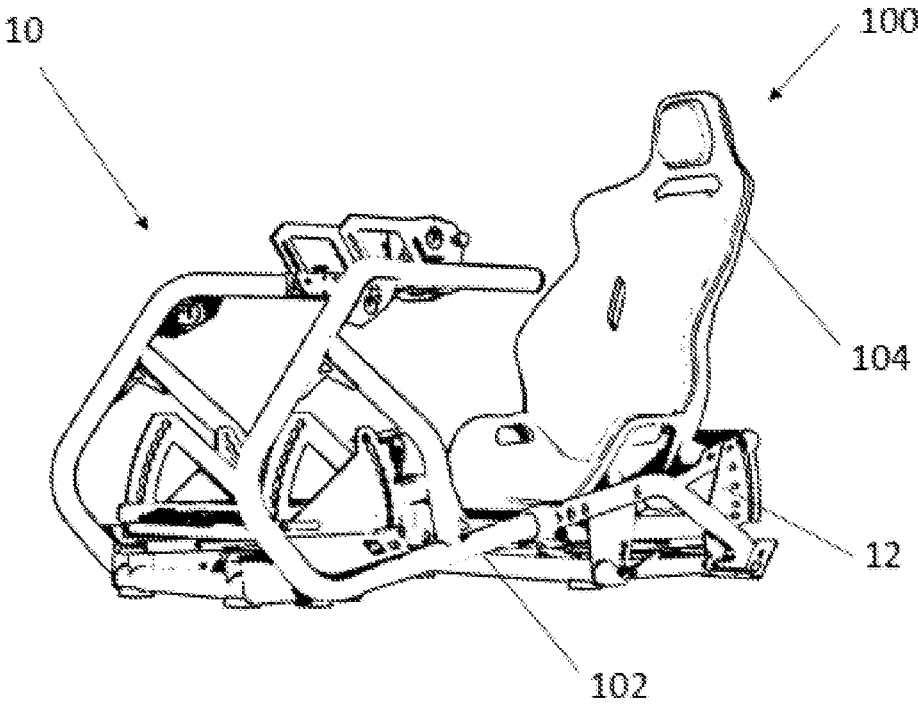
FIG. 17 is a perspective view of the seating unit of FIG. 10 mounted to a chassis of a simulation rig.
Figure 18:
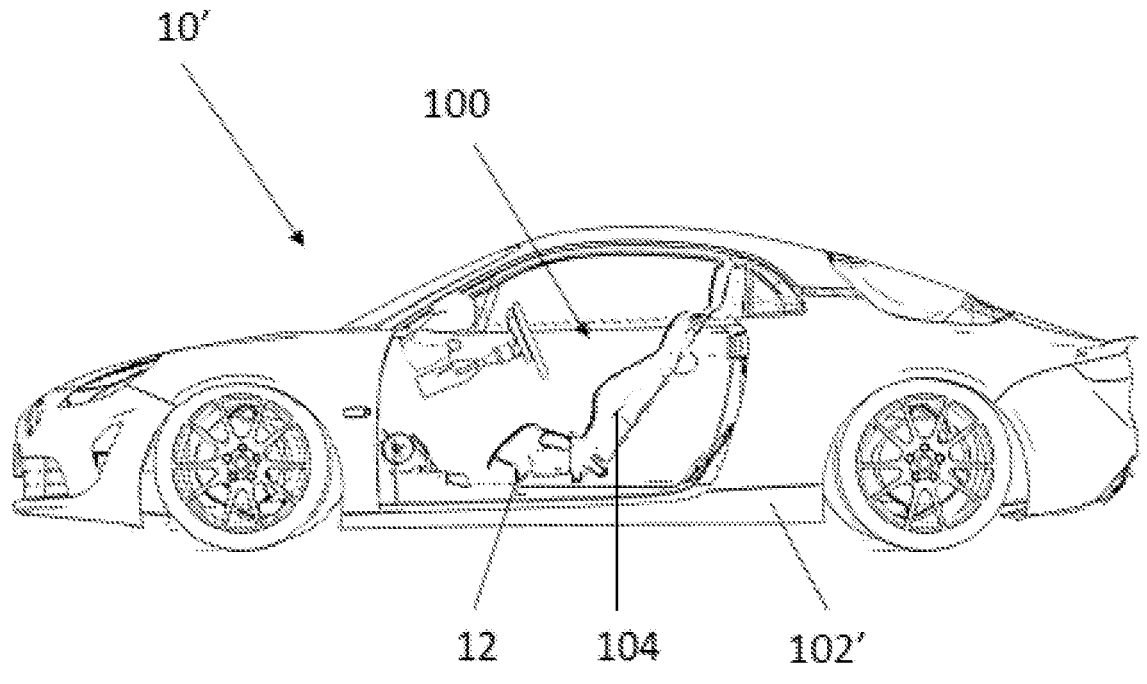
FIG. 18 is a perspective view of the seating unit of FIG. 10 mounted to a chassis of a vehicle.

In general terms, FIGS. 10 to 18 show embodiments of a seating unit 100 for use with a chassis 102 that may comprise part of a simulation rig 10 (FIG. 17) or a vehicle 10' (FIG. 18).

Figure 10:
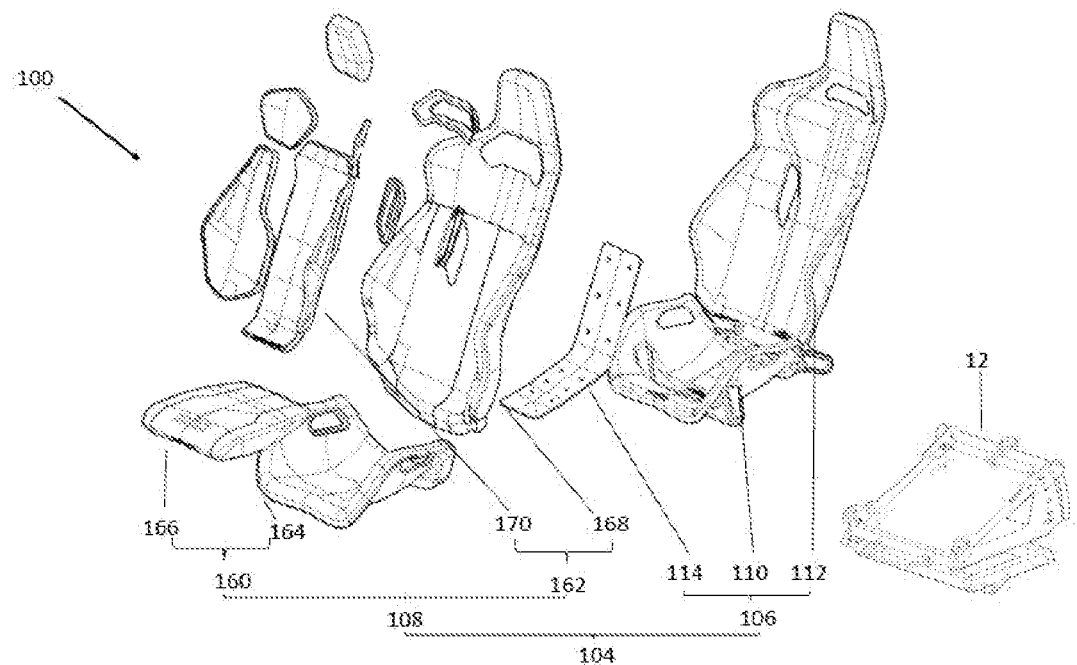
FIG. 10 is an exploded perspective view of a seating unit for a chassis according to an embodiment of the invention, the seating unit comprising a seat assembly and a seating module for coupling the seat assembly to the chassis.

With reference to FIG. 10, the seating unit 100 comprises a seat assembly 104 and seating module for coupling the seat assembly 104 to the chassis 102. The seating module 12 may comprise the seating module 12 as depicted in FIGS. 3 and 4 or in FIGS. 21 and 22. Alternatively, the seating module may have an alternative configuration (not shown).

The seat assembly 104 includes a seat frame 106 and a seat cover 108. The seat frame 106 includes a base frame portion 110 that is couplable to a back frame portion 112 via a rigid connection member 114. In use, with the seat assembly 104 in an operable configuration, the back frame portion 112 is fixedly coupled to the base frame portion 110 in an inclined orientation relative thereto, with the connection member 114 providing a rigid and substantially flex free seat assembly 104. Further, with the seat assembly 104 in a stowed configuration, the base frame portion 110 and the back frame portion 112 are not coupled together, with the base frame portion 110 being nested within the back frame portion 112 so as to provide a compact footprint for storage and or transport. By nesting the components 110, 112, the volume of the seating unit 100 in the stowed form can be reduced by as much as 70%. When compared to conventional "single-piece" or fixed seating designs, this can provide significant savings for shipping and or mass storage.

In the following description, the arrangement of the components will be described with reference to their respective positions when used in-situ by a user seated with the seating unit 100 when coupled to the chassis 102. For clarity, the terms "proximal" and "distal" refer to the position of components with respect to the user. That is, a "distal" end is further away from the user than the "proximal" end. Similarly, the terms "forward" and "rearward" and "front" and "rear" are used to describe respective ends of components, with the "forward" end being in the direction that the user is facing whilst the "rearward" end being in the direction behind the user Likewise, the terms "length", "width" and "height" are used with respect to the seated user, with length referring to a generally horizontal or longitudinal direction along the chassis, width referring to a generally horizontal or lateral direction across the chassis and height referring to a perpendicular and generally vertical direction with respect to the chassis.

While the following description will focus on an embodiment where the chassis 102 comprises a supporting framework 11 of a stationary vehicle simulation rig 10 as illustrated in FIGS. 1 to 9D, it is to be understood that the seating unit is not limited to use therewith and may be mounted, for example, to a chassis 102' of a transport vehicle such as a car or bus and/or to aeroplanes, trains and the like.

The Seat Frame

The seat frame 106 forms the structural skeleton of the seat assembly 104. The seat frame 106 is configured to provide support to a user seated therein. The seat frame 106 is a three piece seat frame comprising three main structural components: base frame portion 110, back frame portion 112 and the rigid connector member 114.

Figure 11:
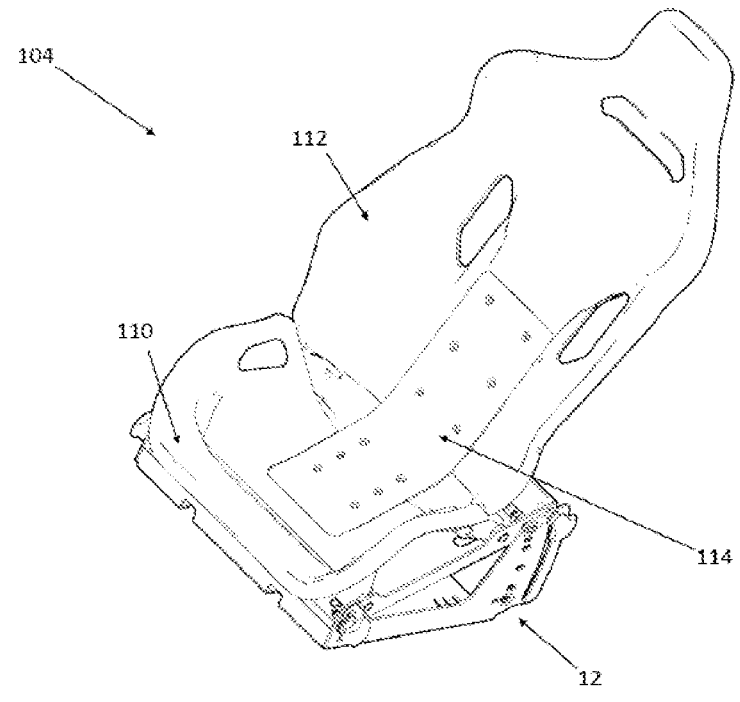
FIG. 11 is a front perspective view of a seat frame of the seat assembly in an operable configuration, the seat frame being coupled to the seating module.

FIG. 11 shows the seat frame 106 in an assembled form corresponding to the operable configuration of the seat assembly 104. In the assembled form, the back frame portion 112 is coupled to the base frame portion 110 via the connection member 114. In the assembled form, the coupling between the back frame portion 112 and base frame portion 110 is a rigid coupling that prevents or at least substantially negates any relative movement between the frame portions 110,112. Because of this, the seat frame 106 is a rigid seat frame that closely replicates the stiffness of a monocoque or single shell seat frame, as perceived by a user when seated therein.

Figure 12:
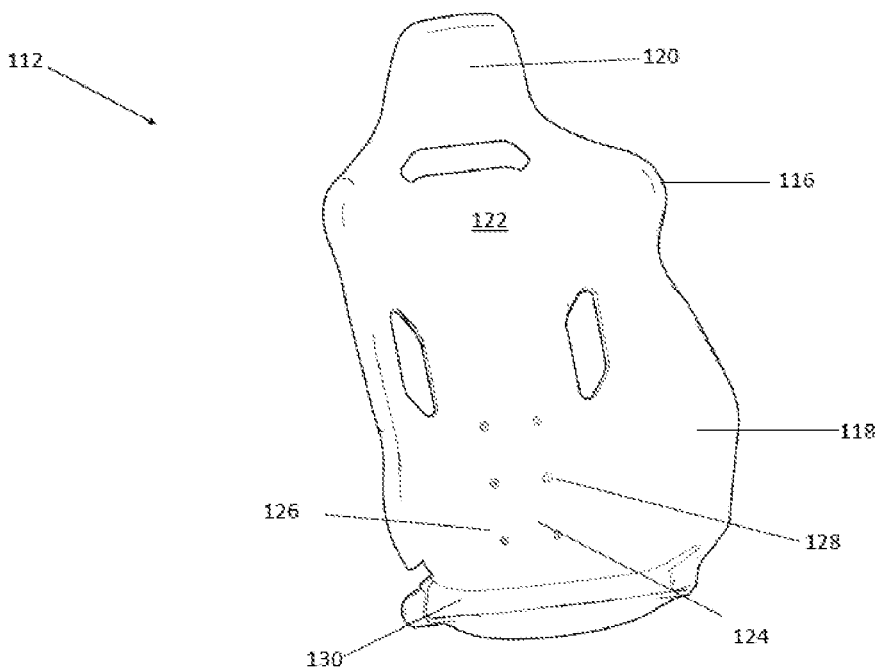
FIG. 12 is a front perspective view of a seat back frame of the seat frame.

Turning first to the back frame portion, as best shown in FIG. 12, the back frame portion 112 is shaped to conform to the body of a user seater therein. Specifically, the back frame portion 112 provides support to an upper body of the user, with a first pair of wings 116 being located towards an upper end thereof to nominally support the shoulders of the user, and a second pair of wings 118 located towards a lower end thereof to nominally support the mid-section of the seated user. A head rest 120 extends above the first pair of wings 116, providing support to the neck and back of head of the user. Each set of wings 116, 118 are curved inwardly with respect to an inner face 122 of the back frame portion. The inner face 122 of the back frame portion 112 is the face of the back frame portion 112 that receives the user therein. Together, the curved wings 116, 118 provide a snug fit that hugs against the upper body of the user seated therein, assisting in retaining the user in a comfortable seated position within the seat assembly 106 during external movement and/or rotation of the chassis 102.

The back frame portion 112 is formed from a substantially inflexible material. Examples of such materials include composites such as fibreglass and carbon fibre, as well as high stiffness polymeric materials such as High Density Polyethylene (HDPE). In other embodiments, light weight metals such as aluminium could also be used. With specific reference to the illustrated embodiments, the back frame portion 112 is provided as a moulded shell. This unitary or single-piece construction of the back frame portion 112 maximises the rigidity or perceived stiffness thereof whilst maintaining a light-weight construction for improved handleability. It is understood, however, that the back frame portion 112 could, alternatively, be formed from a plurality of sub-portions that are fixedly connected together. Such an arrangement, may, for example, enable a further reduced footprint of the seat assembly 106 when in the stowed configuration.

A back frame connection zone 124 is disposed on the inner face 122, substantially towards a centre of the back frame portion 112. The back frame connection zone 124 provides an interface configured to receive the connection member 114. The back frame connection zone 124 is provided as an embossed zone or region of the inner face 122 projecting outwardly therefrom. In other embodiments (not shown) the back frame connection zone 124 may, alternatively, be recessed or substantially flush with respect to the inner face 122. A perimeter of the back frame connection zone 124 is defined by back frame raised lip 126, which extends completely therearound. The back frame raised lip 126 provides a clear, visual reference to assist the user and/or fabricator in correctly locating the connection member 114 during assembly of the seat frame 106. Further, the back frame raised lip 126 serves as a tactile guide to direct the connection member 114 into place. A plurality of holes 128 are provided within the back frame connection zone 124, adapted to receive fasteners (not shown) for fixedly attaching the connection member 114 to thereto. As shown, the back frame connection zone 124 is rectangular shaped. It is understood, however, that the shape of the back frame connection zone 124 need only correspond to that of the part of the connection member 114 that is received therein.

The back frame portion 112 also includes a back frame attachment zone 130. The back frame attachment zone 130 is the region or part of the back frame portion 112 that attaches or mounts to the seating module 12. Best shown in FIGS. 10 and 12, the back frame attachment zone 130 is provided as a foot that projects outwardly from an outer face 132 of the back frame. The outer face 132 opposes the inner face 122, and in use extends behind and faces away from the seated user. As shown, the back frame attachment zone 130 is as an elongate foot, extending substantially across the full width of the back frame portion 112. In this way, flexing of the back frame portion 112 with respect to the seating module 12 is reduced. Furthermore, as best shown in FIG. 12, the back frame attachment zone 130 forms a trough that extends across the inner face 122 of the back frame portion 112. The depth of the trough corresponds to the height of the foot—such that the back frame portion 112 has a constant thickness. Whilst illustrated as a continuous, elongate foot, it is also contemplated that the back frame attachment zone 130 could be provided as a plurality of discrete feet placed at set intervals across the width of the back frame portion 112.

Figure 13:
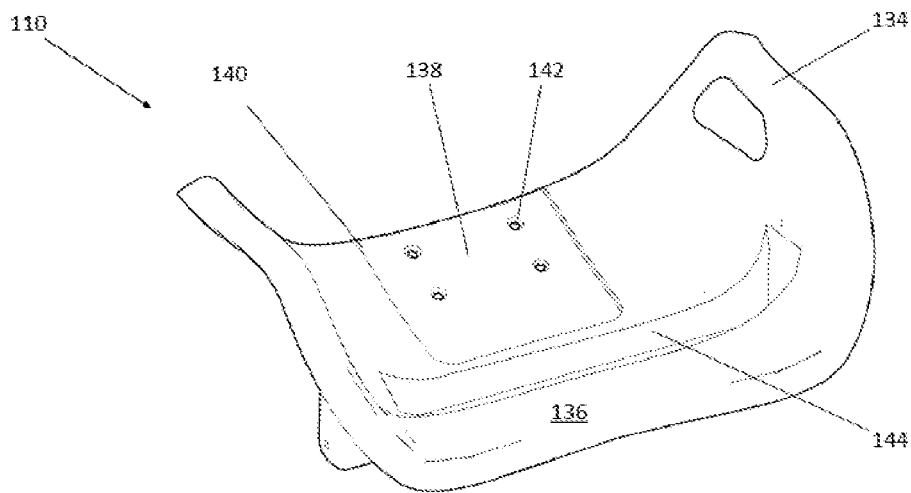
FIG. 13 is a front perspective view of a seat base frame of the seat frame.

Turning now to FIG. 13, which shows the base frame portion 110. Like the back frame portion 112, the base frame portion 110 is shaped to conform to the body of a user seater therein. Specifically, the base frame portion 110 provides a pan adapted to support to a lower body of the user. The base frame portion 110 includes a third pair of wings 134 located along the sides thereof. The wings 134 are adapted to nominally support the hips of the seated user, curving inwardly with respect to an inner face 136 of the base frame portion 110. The inner face 134 of the base frame portion 110 is the face of the base frame portion 110 that receives the user therein. Like the wings 116, 118 of the back frame portion 110, the curved wings 134 provide a snug fit that hugs against the upper body of the user seated therein, assisting in retaining the user in a comfortable seated position within the seat assembly 106 during external movement and/or rotation of the chassis 102. Furthermore, the wings 134 can serve as handles providing easy handleability of the back frame portion 110 during assembly of the seat frame 106.

The base frame portion 110 is also formed from a substantially inflexible material. With specific reference to the illustrated embodiments, the base frame portion 110 is provided as a moulded shell. This unitary or single-piece construction of the base frame portion 110 maximises the rigidity or perceived stiffness thereof whilst maintaining a light-weight construction for improved handleability. It is understood, however, that the base frame portion 110 could, alternatively, be formed from a plurality of sub-portions that are fixedly connected together. Such an arrangement, may, for example, enable a further reduced footprint of the seat assembly 106 when in the stowed configuration.

A base frame connection zone 138 is disposed substantially centrally on the inner face 136, towards a rear edge of the back frame portion 112. Like back frame connection zone 124, the base frame connection zone 138 provides an interface configured to receive the connection member 114. The base frame connection zone 138 is provided as an embossed zone or region of the inner face 136 projecting outwardly therefrom. In other embodiments (not shown) the base frame connection zone 138 may, alternatively, be recessed or substantially flush with respect to the inner face 136. A perimeter of the base frame connection zone 138 is defined by base frame raised lip 140, which extends completely therearound. The base frame raised lip 140 provides a clear, visual reference to assist the user and/or fabricator in correctly locating the connection member 114 during assembly of the seat frame 106. Further, the base frame raised lip 140 serves as a tactile guide to direct the connection member 114 into place. Base frame mounting holes 142 are provided within the base frame connection zone 138, adapted to receive fasteners (not shown) for fixedly attaching the connection member 114 to thereto. As shown, the base frame connection zone 138 is rectangular shaped. It is understood, however, that the shape of the base frame connection zone 138 need only correspond to that of the part of the connection member 114 that is received therein.

The base frame portion 110 also includes a base frame attachment zone 144. The base frame attachment zone 144 is the region or part of the base frame portion 110 that attaches or mounts to the seating module 12. Best shown in FIGS. 13 and 15, the base frame attachment zone 144 is provided as a foot that projects outwardly from an outer face 146 of the back frame. The outer face 146 opposes the inner face 136, and in use extends behind and faces away from the seated user. As shown, the base frame attachment zone 144 is an elongate foot or bar, extending substantially across the full width of the base frame portion 110. In this way, flexing of the base frame portion 110 with respect to the seating module 12 is reduced. Furthermore, as best shown in FIG. 13, the back frame attachment zone 130 forms a trough that extends across the inner face 136 of the base frame portion 110. The depth of the trough corresponds to the height of the foot-such that the base frame portion 110 has a constant thickness. It is also contemplated that the attachment zone 138 could be provided as a plurality of discrete feet placed at set intervals across the width of the base frame portion 110.

Returning briefly to FIG. 11, it can be seen that in the assembled form, the attachment zones 130, 144 of the respective frame portions 110, 112 extend substantially parallel with one another, across a width of the seat frame 106. The attachment zones 130, 144 are adapted to extend across a width of the seating module 12, and be fixedly attached thereto—with the base frame attachment zone 144 of the base frame portion being located towards a front or forward edge of the seating module 12 and the back frame attachment zone 130 of the back frame portion 112 provided towards a rear or back edge of the seating module 12. In this manner, the weight of the user and the seat frame 106 is transferred evenly across the seating module 12 so as to reduce flexure thereof.

Figure 14:
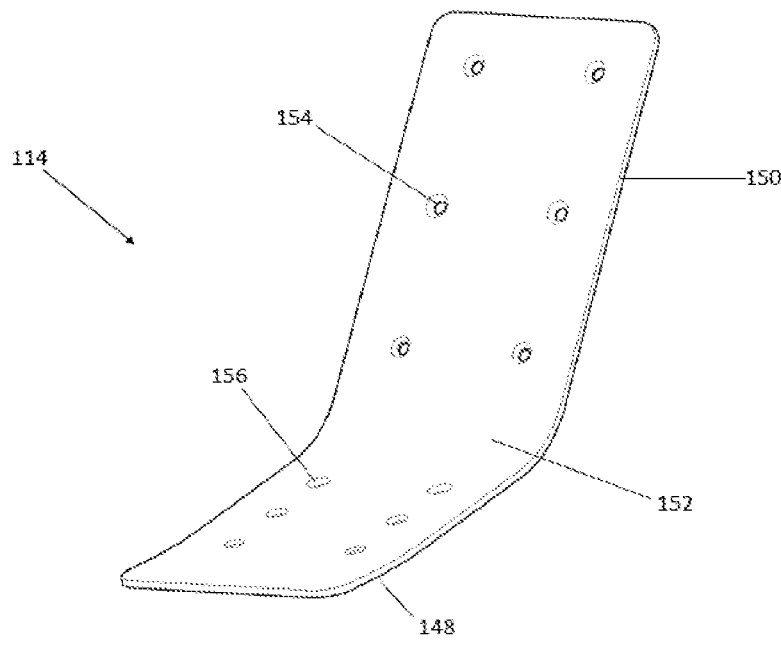
FIG. 14 is a front perspective view of a connector member for coupling the seat back frame to the seat base frame.

FIG. 14 shows an embodiment of the connection member 114 in detail. The connection member 114 is shown as an axially extending angled plate. The connection member 114 extends between a first support surface 148 that is configured to abut against and engage with the base frame connection zone 138 of the base frame portion 110 disposed at a first or distal end thereof and a second support surface 150 disposed at a second or proximal end thereof configured to abut against and engage with the back frame connection zone 124 of the back frame portion 112.

A laterally extending bend 152 is disposed substantially mid-way along a length of the connection member 114, between the first and second support surfaces 148,150.

When viewed from a side perspective, the bend 152 provides the connection member 114 with a V or chevron shape. The bend 152 holds the second support surface 150 at an inclined angle with respect to the first support surface 148. As such, when the frame portions 110,112 are coupled thereto, the back frame portion 112 is held an in inclined orientation with respect to the base frame portion 110. Depending on the magnitude of the bend 152, the angle at which the back frame portion 112 is held is different, with a larger angle of bend corresponding to a more upright seating position for the user. As shown, the bend 152 has a magnitude of about 45 degrees from the horizontal (i.e. from a substantially straight, flat plate). This bend results in the second support surface 150 being held at an angle of about 135 degrees with respect to the first support surface, which is substantially horizontal. In other embodiments, it is contemplated that the bend 152 may be of a different magnitude of, for example, between 20 degrees and 90 degrees.

The connection member 114 is formed from a rigid material. In the illustrated embodiment, the connection member 114 is formed from a steel plate. Other suitable materials include, for example, aluminium, fibre reinforced composites such as fibre glass and carbon fibre. Because the connection member 114 is an integrally formed unitary elongate plate, the connection member 114 is a rigid connection member that holds the respective frame portions at a locked angle with respect to each other.

A plurality of apertures 154, 156 are respectively provided within each of the support surfaces 148,150. The apertures 154, 156 are designed to align with the back frame mounting holes 128 and base frame mounting holes 142 of the respective connection zones 124,138 of the back and base frame portions 112, 110 to enable coupling of the connection member 114 thereto via fasteners (not shown). It is contemplated that the fasteners may provide a "quick release" system that enables each decoupling to enable a user to quickly and easily assemble and disassemble the seat frame 106 as required. Furthermore, whilst the illustrated embodiment shows an equal number of apertures 154 to back frame mounting holes 128 and base frame mounting holes 142, it is understood that this is not necessary.

The rigidity/stiffness of the frame 106 can be further supplemented via the use of supplementary fixing members 115. The supplementary fixing members 115 are best shown in FIG. 10. The supplementary fixing members 115 are bracket like members, adapted to fix together the base and back frame portions 110,112 along opposing sides thereof.

It is contemplated that the connection member 114 may be one of a plurality of different connection members 114 provided within a kit of components corresponding to the seat unit 100. A first connection piece 114 could thus be interchanged for a second connection piece 114', either during the manufacturing and packaging process, or by the end user, to allow more than one possible combination of angles between the seat base and seat back, creating a flexible seating solution. For example, when used as a seat for a simulation rig 10, the seating position can be altered by the end user between a recumbent or reclined position and a more upright position by simply interchanging the connection member 114. This enables the seat unit 100 to accurately simulate the driving position of several types of racing simulation.

Whilst not shown in the Figures, it is also contemplated that the first and second support surfaces 148,150 may be provided as separate components, with the bend 152 replaced by an adjustable hinge 152'. Notably, the hinge 152' is a lockable hinge, such that with the hinge 152' locked in a set position, the connection member 114 retains a stiffness equivalent to that of a rigid plate. In this way, the stiffness of the seat frame 106 in the operable configuration is not compromised.

The hinge provides adjustability of the angle of inclination at which the back frame portion 112 is held with respect to the base frame portion 110 when the seat assembly 104 is in the operable configuration. The relative angles may be provided as a discrete number of set positions of the hinge, or, alternatively, the hinge may provide continuous adjustment. Such adjustability enhances the comfort of users of different stature and body types, some of whom may feel more comfortable being seated in relatively upright or, alternatively, more reclined positions over extended periods of time. Furthermore, the adjustability may be particularly useful for users of a simulation rig 10, as shown in FIG. 17. This is because the adjustability enables the seating unit 100 to simulate the driving positions of a variety of different vehicles, for example a more reclined or recumbent position associated with Formula style race cars and a more upright position associated with tin-tops.

It is also contemplated that the adjustable hinge can provide a further, folded, configuration of the seat assembly 104. In the folded configuration of the seat assembly 104, the base frame portion 110 and back frame portion 112 are moved towards each other to face and/or substantially abut against each other. The folded configuration is useful in that the storage volume of the seat assembly 106 is reduced whilst the components of the frame 106 remain coupled together.

Best shown in FIG. 11, in use, the connection member 114 is centrally disposed along the seat frame 106 and conforms or corresponds to the spine and pelvis of the user. Specifically, the upper part of the connection member 114, comprising the first support surface 148 is adapted to align with the spine of the user when seated in a reclined or recumbent position therein. Further, the lower part of the connection member 114, comprising the lower support surface 150, is adapted to align with the pelvis and upper legs of the user or occupant. Together with the inherent rigidity of the connection member 114 itself, this arrangement enables the split or two-piece seat frame (i.e. comprising a base and a separate back) to have an equivalent perceived stiffness to a one piece or single shell seat.

Figure 15:
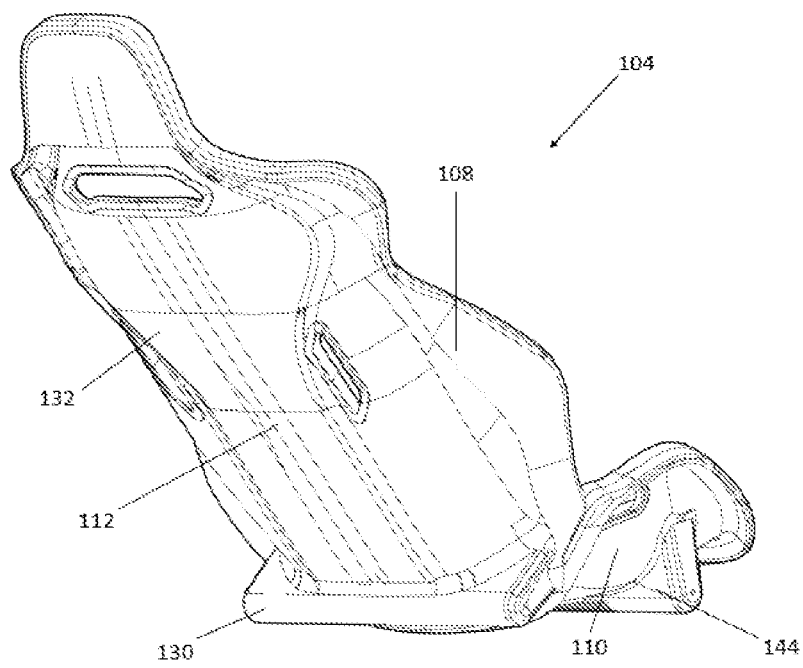
FIG. 15 is a rear perspective view of a seat cover of the seat assembly fitted to the seat frame.

Moving now to FIGS. 15 and 16, these Figures show the seat assembly 104 also including a seat cover 108. The seat cover 108 is an upholstered cover that is provided principally for the comfort of the user. Like the seat frame 106, the seat cover 108 is a split seat cover, and provided as two separate sections. Specifically, the seat cover includes a base cover section 160 and a back cover section 162.

Best shown in FIG. 15, the base cover section 160 is configured to fit to the base frame portion 110 whilst the back cover section 162 is configured to fit to the back frame portion 112. With specific reference to the illustrated embodiments, the seat cover 108 is an upholstered seat cover that is designed to fit over and around the respective inner faces 122,136 of the frame 106.

In the operable configuration, with the seat cover 108 fitted to the seat assembly 104, the connection member 114 is at least partially concealed, being disposed between the seat cover 108 and seat back and seat base cover portions 110, 112. Whilst not shown in the Figures, in the stowed configuration, the seat cover 108 is not fitted to the frame 106. Rather, the respective sections 160, 162 of the seat cover 108 are nestable within the frame portions 110,112 of the frame 106. This nest ability provides a significantly reduced footprint of the seating unit 100, facilitating far more efficient storage and transport. For example, it is estimated that the volume of the seating unit 100 in the stowed configuration is approximately 30% of that of a similar sized single piece/integral seat shell.

Furthermore, whilst not clearly shown in the Figures, it is understood that both sections 160,162 of the cover 108 include at least one flap or removable panel to provide access to the connection member 114 located beneath. In this way, a user and/or fabricator is easily provided with access to the connection member 114, facilitating quick and simple self-assembly and/or disassembly by the user and/or fabricator.

Returning briefly to FIG. 10, in an exemplary embodiment of the cover 108, both the base cover section 160 and the back cover section 162 comprise an inner padding section 164/168 and an outer padding section 166,170. When in the operable form (as shown, for example, in FIG. 16, the inner padding sections 164,168 are fitted over the respective frame portions 110,112 while the respective outer padding sections 166,170 are attached or otherwise applied to the inner padding sections 164, 168. The outer padding sections 166,170 may be provided as a plurality of removeable padding elements that are, for example, temporarily attachable to the inner padding sections 164, 168 via hoop and loop fasteners or similar. In this way, the visual appearance of the seat cover 108 can be altered or customised by the manufacturer and/or end user by selecting padding elements of differing shapes and arranging the respective padding elements accordingly. By varying the shape and/or arrangement of padding elements, the ergonomics and comfort of the seating unit 100 can be tailored to suit the individual user.

The Seating Module

The seating module 12 is configured to couple the seating unit 100 to the chassis 102. In particular the seating module 12 is adapted to fixedly attach the seating unit 100 to the chassis 102, with the seat assembly 104 being moveably mounted thereto.

FIGS. 3 and 4 show an embodiment of the seating module 12, with FIGS. 17 and 18 showing the seating module 12 coupling the seat assembly 104 to chassis 102 of a simulation rig 10 and to a chassis 102' of a vehicle 10' respectively.

A detailed description of the seating module 12 has been previously set out above with reference to FIGS. 3 and 4 and FIGS. 21 and 22 and in respect of the support frame 11 of the simulation rig 10 as shown in FIG. 17. A similar description is applicable for the seating module 12 fixedly attaching the seating unit 100 to the chassis 102' of the vehicle 10' as shown in FIG. 18.

Returning now to FIGS. 3 and 4 and FIGS. 21 and 22, as previously mentioned the support assembly is fixedly attached to a pair of seating module slide rails 35. The seating module slide rails 35 are lateral slide rails, being spaced apart in the lateral direction across a width of the chassis 100 to which they are fixedly attached. Each slide rail 35 extends along the longitudinal axis, to thereby provide positional adjustment of the connected seating module brackets 22 and supported seating module mounting plate 21 (and thus seat assembly 104 mounted thereto) in a lengthwise direction along the chassis 102. For example, with respect to the embodiment shown in FIG. 17, the seat assembly 104 can be moved towards the proximal or rear end of the simulation rig 10, to thereby cater for users of greater height. Furthermore, with respect to the embodiment shown in FIG. 18, the seat assembly 104 can be moved in a forward or rearward direction to provide additional leg room to the driver or passenger. Such adjustability enables the seating unit to provide a comfortable and usable seating position for users of both taller and smaller statures with respect to the chassis 102.

This lengthwise adjustment is performed by the user operating the actuator 30 as previously described.

The Chassis

FIGS. 17 and 18 show the seating module 100 in situ, when attached to a chassis 102. Specifically, FIG. 17 shows the seating unit 100 when used as part of an adjustable racing car simulation rig 10, whilst FIG. 18 shows the seating module when used in a standard passenger vehicle 10'.

With brief reference to FIG. 17, it is noted that the seat assembly 104 is mounted to the chassis 102 of a simulation rig 10 via the seat module 12. As previously described, the seat module 12 is fixedly attached to the support frame of the simulation rig 10.

Because the seat module 12 is an adjustable seating module, the seat assembly 104 is moveable with respect to the simulation rig 10. In this way, the position of the user relative to control devices, for example a steering wheel and pedals, and the relative angle between upper and lower body of the user can differ significantly. It is also contemplated that the seat assembly 104 may be directly mounted to the chassis 102 by way of conventional fasteners and the like.

Turning finally to FIG. 18, it is understood that the seat assembly 104 is mounted to the chassis 102' of the vehicle via the seat module 12. It is also contemplated that the seat assembly 104 may be directly mounted to the chassis 102' by way of conventional fasteners and the like. The workings and advantages of the seating unit 100 when mounted to a conventional passenger vehicle 10' are the same as those provided when mounted to a simulation rig 10. That is, the seating unit 100 provides improved levels of adjustability in driving/seating position in addition to a quick and easy to assemble design. For example, it is contemplated that should such a design be used in a passenger vehicle, a user would be able to quickly and easily self-install different seat assemblies 104 into their vehicle, with the seating module 12 being pre-fitted to the chassis 102 thereof. Further, a fabricator/repairer would be able to easily replace damaged seat frames 106 in said vehicle without the need to remove the seating module 12. It is also contemplated that the seating unit 100 can be used for other types of passenger vehicle, such as trains and airplanes. In such cases, the improved levels of ergonomic adjustment, as well as quick and easy assembly/replacement would be particularly desirable.

Summarily, it is understood that the simulation rig as described herein provides increased adjustability to simulate an operational position of a wide range of recreational simulators. In particular, the rig allows the simulation of the driving position of a wide range of racing vehicles. This enhanced level of adjustability also enables the rig to be used by people of differing stature and ergonomic requirements, to ensure a comfortable and ergonomically suitable driving position. This level of adjustability is provided by way of three modules, each of which is mutually adjustable in three directions with respect to a support frame to which the modules are coupled.

It is also understood that the seating unit as described herein provides a split or multi-part seat assembly having the same rigidity as a conventional single-piece shell design. Advantageously, the multi-part seat assembly can be configured in a stowed configuration, with the components thereof being nested within each other providing a significantly reduced volumetric footprint facilitating more efficient shipping and storage. Furthermore, it is understood that the seating unit provides increased levels of user adjustability for users of differing statures and ergonomic requirements.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the example methods and materials are described herein.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

| LEGEND | |
|---|---|
| # No. | Name |
| 10 | Adjustable rig |
| 10' | Vehicle |
| 11 | Support frame |
| 15 | Side members |
| 16 | Base member |
| 17 | Mounting holes |
| 18 | Lower portion |
| 19 | Upper portion |
| 20 | Feet |

-continued

| LEGEND | |
| --- | --- |
| # No. | Name |
| L | Longitudinal Axis |
| 56 | Screen holder |
| 57 | Side mounting plate |
| 12 | Seating module |
| 21 | Seating module mounting plate |
| 22 | Seating module brackets |
| 23 | Seating module first slot |
| 24 | Seating module recesses |
| 25 | Fastening member |
| 26 | Knob |
| 27 | Receiving hole |
| 28 | Seating module second slot |
| 29 | Fastening member |
| 30 | Actuator |
| 30A | Receiving hole |
| 31 | Apertures |
| 32 | Detent |
| 33 | Spring member |
| 34 | Lever |
| 35 | Seating module slide rails |
| S | Seat |
| 58 | Seat brackets |
| 13 | Steering module |
| 36 | Steering module mounting plate |
| 37 | Steering module brackets |
| 38 | Fastening element |
| 39 | Steering module recesses |
| 40 | First fastening member |
| 41 | Steering module first slot |
| 42 | Steering module second slot |
| 43 | Second fastening member |
| 44 | Steering module slide rails |
| 45 | Set screw |
| W | Steering Wheel |
| 59 | Steering module third slot |
| 14 | Pedal module |
| 46 | Pedal module mounting plate |
| 47 | Inner brackets |
| 48 | Inner slot |
| 49 | Inner recesses |
| 50 | Inner fastening member |
| 51 | Outer brackets |
| 52 | Outer slot |
| 53 | Outer recesses |
| 54 | Outer Fastening member |
| 55 | Pedal module slide rails |
| P | Pedals |
| 60 | Pedal module base |
| 100 | Seating unit |
| 102 | Chassis |
| 104 | Seat assembly |
| 106 | Seat frame |
| 108 | Seat cover |
| 110 | Base frame portion |
| 112 | Back frame portion |
| 114 | Connection member |
| 116 | Upper wings of back frame |
| 118 | Lower wings of back frame |
| 120 | Head rest of back frame |
| 122 | Inner face of back frame |
| 124 | Back frame connection zone |
| 126 | Back frame raised lip |
| 128 | Back frame mounting holes |
| 130 | Back frame attachment zone |
| 132 | Outer face of back frame |
| 134 | Wings of base frame |
| 136 | Inner face of base frame |
| 138 | Base frame connection zone |
| 140 | Base frame raised lip |
| 142 | Base frame mounting holes |
| 144 | Base frame attachment zone |
| 146 | Outer face of base frame |
| 148 | First support surface |
| 150 | Second support surface |
| 152 | Bend |

-continued

| LEGEND | |
| --- | --- |
| # No. | Name |
| 154 | Back apertures of connection member |
| 156 | Base apertures of connection member |
| 160 | Base cover section |
| 162 | Back cover section |
| 164 | Base inner padding |
| 166 | Base outer padding |
| 168 | Back inner padding |
| 170 | Back outer padding |

The invention claimed is:

1. An adjustable rig for a simulator, comprising:

a support frame comprising a pair of U-shaped side members and having a longitudinal axis, wherein the U-shaped side members extend along the longitudinal axis of the support frame and a U-shaped base member extends therebetween;

a seating module couplable to the support frame;

a steering module couplable to the support frame; and a pedal module couplable to the support frame;

wherein each of the modules is adjustable in three directions relative to the longitudinal axis of the support frame when coupled thereto;

wherein each module includes lateral slide rails that provide adjustment in a lengthwise direction along the longitudinal axis of the support frame when coupled thereto;

wherein each module includes at least a first pair of brackets that are configured to provide adjustment in at least one of a height direction perpendicular to the longitudinal axis of the support frame and an angular direction relative to the longitudinal axis of the support frame when coupled thereto; and wherein the U-shaped side members are slidably attached to the U-shaped base member facilitating adjustment of a length of the support frame along its longitudinal axis.

2. The rig of claim 1, wherein each of the modules includes a mounting plate the position of which is adjustable in the lengthwise, angular and height directions relative to the support frame when coupled thereto.

3. The rig of claim 2, wherein the mounting plate of the steering module is a wheel mounting plate for mounting a steering wheel thereto.

4. The rig of claim 2, wherein each of the at least first pair of brackets includes at least a first positioning arrangement that includes a plurality of fastener positions for receiving a fastener to set the respective mounting plate at discrete positions relative to the support frame.

5. The rig of claim 4, wherein the at least first positioning arrangement includes an elongate slot that includes the plurality of fastener positions.

6. The rig of claim 5, wherein the fastener is adjustable via a knob or lever facilitating manual adjustment of the position of the mounting plate.

7. The rig of claim 6, wherein the elongate slot of the steering module provides height adjustment of the respective mounting plate relative to the support frame.

8. The rig of claim 2, wherein the mounting plate of the steering module is pivotably attached to the at least first pair of brackets to provide angular adjustment thereof relative to the support frame.

9. The rig of claim 2, wherein the pedal module includes a second pair of brackets, arranged such that the first pair of brackets is nested between the second pair of brackets and the respective mounting plate, the first and second pair of brackets together providing height adjustment of the mounting plate relative to the support frame.

10. The rig of claim 9, wherein the second pair of brackets includes an elongate slot for adjusting the orientation of the pedal mounting plate relative to the support frame.

11. The rig of claim 5, wherein the at least first pair of brackets of the seating module include a second positioning arrangement comprising an elongate slot, wherein the elongate slots of the first and second positioning arrangements together provide height adjustment of the respective mounting plate with respect to the support frame.

12. The rig of claim 11, wherein the at least first pair of brackets of the seating module include a plurality of apertures adjacent to the elongate slot of the second positioning arrangement, the plurality of apertures configured to receive a detent to provide fine angular adjustment of the respective mounting plate relative to the support frame.

13. The rig of claim 12, wherein the detents of each bracket are interconnected via a spring-loaded cable, facilitating fine angular adjustment of the respective mounting plate via a pull lever.

14. The rig of claim 1 further comprising a seating unit, comprising:

a seat assembly including:

a base frame portion;

a back frame portion; and a rigid connection member having a first support surface configured to support the base frame portion and a second support surface configured to support the back frame portion;

wherein in an operable configuration of the seat assembly the back frame portion is fixedly coupled to the base frame portion in an inclined orientation relative thereto by the connection member; and wherein in a stowed configuration the base frame portion is separated from and nested within the back frame portion.

15. The rig of claim 14, wherein, in the operable configuration, the connection member extends axially along a mid-section of the seat assembly so as to substantially align with the spine of a user seated therein.

16. An adjustable rig for a simulator, comprising:

a support frame having a longitudinal axis;

a seating module couplable to the support frame;

a steering module couplable to the support frame; and a pedal module couplable to the support frame;

wherein:

each of the modules is adjustable in three directions relative to the longitudinal axis of the support frame when coupled thereto;

each module includes at least a first pair of brackets that are configured to provide adjustment in at least one of a height direction perpendicular to the longitudinal axis of the support frame and an angular direction relative to the longitudinal axis of the support frame when coupled thereto;

each of the modules includes a mounting plate; and the pedal module includes a second pair of brackets, arranged such that the first pair of brackets is nested between the second pair of brackets and the respective mounting plate, the first and second pair of brackets together providing height adjustment of the mounting plate relative to the support frame.

17. The rig of claim 16, wherein the second pair of brackets includes an elongate slot for adjusting the orientation of the pedal mounting plate relative to the support frame.

18. The rig of claim 16, wherein each of the at least first pair of brackets includes at least a first positioning arrangement that includes a plurality of fastener positions for receiving a fastener to set the respective mounting plate at discrete positions relative to the support frame.

19. The rig of claim 16, wherein each module includes lateral slide rails that provide adjustment in a lengthwise direction along the longitudinal axis of the support frame when coupled thereto.

20. The rig of claim 16, wherein the position of the mounting plate of each module is adjustable in the lengthwise, angular and height directions relative to the support frame when coupled thereto.

\* \* \* \* \*